Dec. 8, 1953 J. F. SCHOUTEN ET AL 2,662,113

PULSE-CODE MODULATION COMMUNICATION SYSTEM

Filed Feb. 10, 1949 8 Sheets-Sheet 1

INVENTORS
JAN FREDERIK SCHOUTEN
FRANK de JAGER

BY [signature]

AGENT

INVENTORS
JAN FREDERIK SCHOUTEN
FRANK de JAGER
BY [signature]
AGENT

INVENTORS
JAN FREDERIK SCHOUTEN
FRANK de JAGER
BY [signature]
AGENT

INVENTORS
JAN FREDERIK SCHOUTEN
FRANK de JAGER
BY [signature]
AGENT

INVENTORS
JAN FREDERIK SCHOUTEN
FRANK de JAGER
BY [signature]
AGENT

Dec. 8, 1953 J. F. SCHOUTEN ET AL 2,662,113

PULSE-CODE MODULATION COMMUNICATION SYSTEM

Filed Feb. 10, 1949 8 Sheets-Sheet 6

INVENTORS
JAN FREDERIK SCHOUTEN
FRANK de JAGER

BY [signature]

AGENT

PULSE-CODE MODULATION COMMUNICATION SYSTEM

Filed Feb. 10, 1949 8 Sheets-Sheet 7

INVENTORS
JAN FREDERIK SCHOUTEN
FRANK de JAGER
BY [signature]
AGENT

INVENTORS
JAN FREDERIK SCHOUTEN
FRANK de JAGER
BY [signature]
AGENT

Patented Dec. 8, 1953

2,662,113

UNITED STATES PATENT OFFICE 2,662,113

PULSE-CODE MODULATION COMMUNICATION SYSTEM

Jan Frederik Schouten and Frank de Jager, Eindhoven, Netherlands, assignors to Hartford National Bank and Trust Company, Hartford, Conn., as trustee Application February 10, 1949, Serial No. 75,663

Claims priority, application Netherlands October 4, 1948

30 Claims. (Cl. 178—43.5)

The invention relates to a system for transmitting signals, either directly or by means of radio- or light-waves, with the use of pulse-code modulation and to transmitters and receivers for use therein. More particularly the invention relates to transmission of signals the amplitude and frequency of which vary at will within definite limits, such for example, as speech, music or television signals, in contradistinction to signals the amplitude and frequency of which do not vary at will, such for example as Morse signals, although the latter may be transmitted with the use of the invention.

In order that a particularly favourable signal-to-noise ratio may be achieved when transmitting signals by pulse modulation, it has been proposed to utilise pulse code modulation with the use of a pulse-group code.

A feature of this method of signal transmission, referred to hereinafter as "pulse-group code modulation," is the combined use of time- and amplitude-quantization in conjunction with a pulse-group code.

The use of time quantization is to be taken to mean that only such pulses are emitted as coincide with pulses from a series of equidistant pulses. This permits of substantially eliminating transmission errors introduced into the receiver due to time shifts of the signal pulses by the use of regenerators which may be preceded by amplitude threshold and amplitude limiting devices. Particularly when transmitting signals through several relay transmitters this is a particular advantage which fails in other kinds of pulse modulation, such for example as pulse-phase modulation or pulse-frequency modulation.

Whereas other conventional methods of modulation enable transmission of any arbitrary instantaneous value of the signal lying within definite limits, amplitude quantization with the use of a pulse-group code only permits of transmitting a restricted number of amplitude levels for example 32 or 128 respectively with the use of a five or seven digit code.

In this case the signal to be transmitted is scanned at equidistant instants but instead of transmitting the instantaneous values of the signal which occur at these equidistant instants, each time the most adjacent one of the 32 or 128 transmissible amplitude levels is transmitted in a particular manner, since the level required to be transmitted is coded in a code-pulse-group modulator, that is to say the use of a five digit code results in the production of a code-pulse-group characteristic of the said level which does not comprise more than 5 identical and equidistant pulses and which is transmitted, the presence or the absence of one or more pulses of a code-pulsegroup characterizing the amplitude level and thus approximately the instantaneous value of the signal. The emitted pulse-groups are equidistant and exhibit a recurrence frequency (cycle frequency) which is about twice the maximum signal frequency to be transmitted.

It should be noted here that the minimum number of digits in pulsegroup code modulation is two (code-pulsegroups of not more than two pulses) by which four amplitude levels may be characterized.

In pulse-code transmission with the use of a code-pulsegroup modulation the incoming (regenerated) code-pulsegroups must be decoded by the use of a code-pulsegroup demodulator. The output voltage of the code-pulsegroup demodulator is scanned in the rhythm of the cycle frequency, so that the instantaneous signal values occurring across the demodulator each time upon reception of a code-pulsegroup are fed in succession to a user for reconstruction of the transmitted signal.

Since in pulsegroup-code modulation use is made of a restricted number of amplitude levels, no accurate image of the signal to be transmitted, but only an approximation thereto is transmitted and this results in a certain "coding noise" or "quantization noise," which, however, is fairly tolerable when using a five digit code and a suitably chosen cycle frequency and when employing the seven digit code exhibits a level permissible for telephone purposes. However, the greater the number of digits of the code, the greater is the number of technical difficulties of the decoding and coding devices.

In pulse-group-code modulation the recurrence frequency of the pulse-groups or else the cycle frequency is required to exceed the maximum signal frequency to be transmitted. A reproduction quality suitable for telephone purposes is achieved, when this cycle frequency is about two or two and a half times the maximum signal frequency to be transmitted. In a known system the cycle frequency is 800 cs./s. for a maximum signal frequency of 3400 cs./s.

In television transmission, in which a considerably larger frequency range (for example from 15 cs./s. to $5.10^6$ cs./s.) must be transmitted, a slightly smaller ratio of maximum signal frequency to cycle frequency is generally sufficient.

The described pulse-group-code modulation lends itself for use in so-called time-division multiplex systems in which periodically values characterizing different intelligence signals are transmitted in succession.

With the use of pulse-group-code modulation as described above accurate synchronization of transmitting and receiving apparatus is required. This synchronization may be achieved in various known ways the most suitable of which may be chosen in accordance with the equipment employed. Thus, for example, synchronization pulses may be transmitted by way of a separate synchronization channel. It is also known to reserve a definite pulse of a code-pulse-group (for example the first or the last pulse) for synchronization purposes and to characterize it as such pulse by alternately transmitting and suppressing it in successive code-pulse-groups. In a time-division multiplex system it is sufficient to transmit a synchronization pulse in one of the transmission channels. The required synchronization will not be given special attention to hereinafter, because the invention is not directly concerned therewith.

The present invention has for its object to provide improvements in and simplification of systems, transmitters and receivers for transmission of signals with the use of pulse-group-code modulation.

According to the invention, in a system or transmitter for transmission of signals with the use of pulse-code modulation, in which the signals to be transmitted control a code-pulse-group modulator, the latter is bridged by a negative feedback circuit comprising the series combination of a code-pulse-group demodulator and a signal frequencies integrating network, the signal to be transmitted and an approximation signal taken from the negative feedback circuit being supplied to a difference producer of which the difference voltage output controls the code-pulse-group modulator.

The term "signal frequencies integrating network" is to be understood to mean in this specification a network by which an output voltage which is proportional to the time-integral of the input voltage is supplied for a material part or the entire frequency range of the signals to be transmitted. In its simplest form such a network comprises a series resistance and a transverse condenser of such value that the time constant approximately corresponds to or exceeds one period of a central or preferably lower signal frequency and in which, consequently, at a constant input voltage the output voltage decreases from a central frequency or a lower frequency with increasing signal frequency, in contradistinction to a low-pass filter which allows in a substantially uniform manner the passage of all the signal frequencies. Such signal frequencies integrating networks are known per se and are used, for example, in receivers devised for reception of oscillations modulated in frequency with pre-emphasis (emphasising signal frequencies exceeding for example from 1200 to 1300 cs./s.).

Receivers to be used in a system or in conjunction with a transmitter according to the invention for the signals to be transmitted differ from known receivers for pulse-group-code modulation by a signal frequencies integrating network and connected in accordance with the invention in the receiver between the code-pulse-group demodulator and the reproduction device.

It is surprising to find that in contradistinction to the known pulse-group-code modulation systems, without detracting from the transmission quality and without increase of the frequency band required for transmission, the use of the invention permits of materially reducing the number of digits of the code-pulse-groups employed with an increase of the cycle frequency which considerably simplifies the construction of the coding and decoding means to be used. The cycle frequency is preferably at least four times the maximum signal frequency to be transmitted. Additional advantages with respect to the equipment employed are found to be obtainable and will be given further consideration hereinafter.

The use of the invention involves a material change in the method of transmitting signals. Whereas in the conventional pulse-modulation technique each time the instantaneous value of the signal to be transmitted is characterized by frequency shifts or phase deviations or, alternatively, by a specific pulse-group-code, code-pulse-groups starting at equidistant instants are now transmitted, which, at least to a first approximation, are in a considerable part of the transmitted frequency range independent of the instantaneous value of the signal to be transmitted and essentially each time at an instant of transmission characterize the difference only between the then occurring instantaneous value of the signal to be transmitted and the approximation signal which is taken from the negative feedback circuit and which corresponds to the instantaneous value of the signal transmitted at the immediately preceding instant of transmission.

As a rule, the said difference voltage is transmitted by the transmission only approximately, since each time the most adjacent one of the, say, 8 or 16 transmissible amplitude levels is transmitted when use is made of a three or four digit code and this in a manner as in the case of the instantaneous value of the signal with the pulse-group-code modulation as assumed to be known.

In order that the invention may be more clearly understood and readily carried into effect, it will now be described more fully with reference to the accompanying drawing.

Figure 5A:
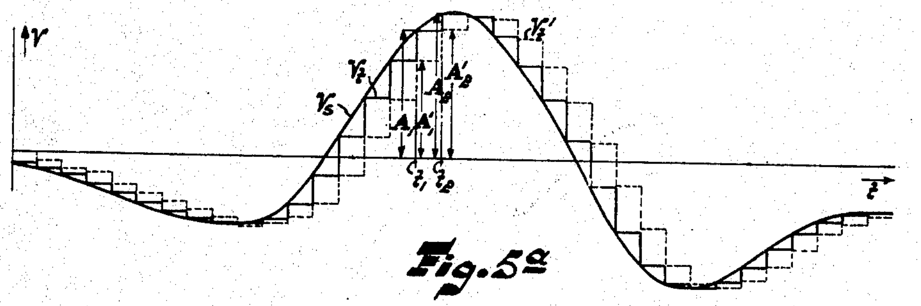
Figure 5B:
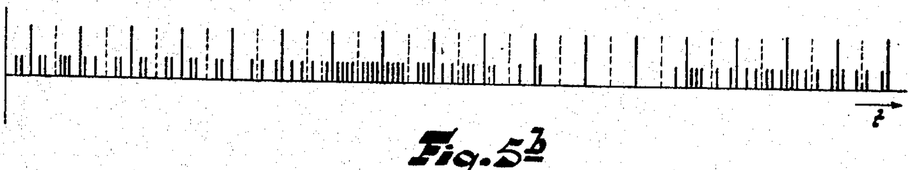

Figs. 5*a* and 5*b* are diagrams explaining the operation of said transmitter and also showing code-pulsegroups.

Figure 4:
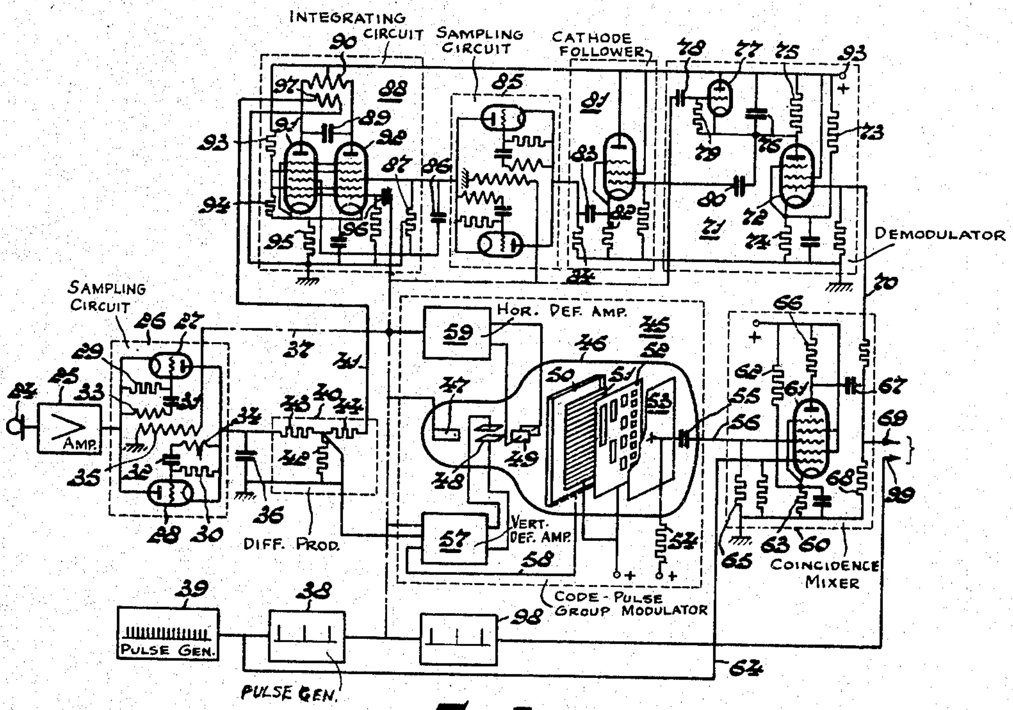
Fig. 4 is a diagrammatic detail view of the transmitter shown in block diagram form in Fig. 1.
Figure 6:
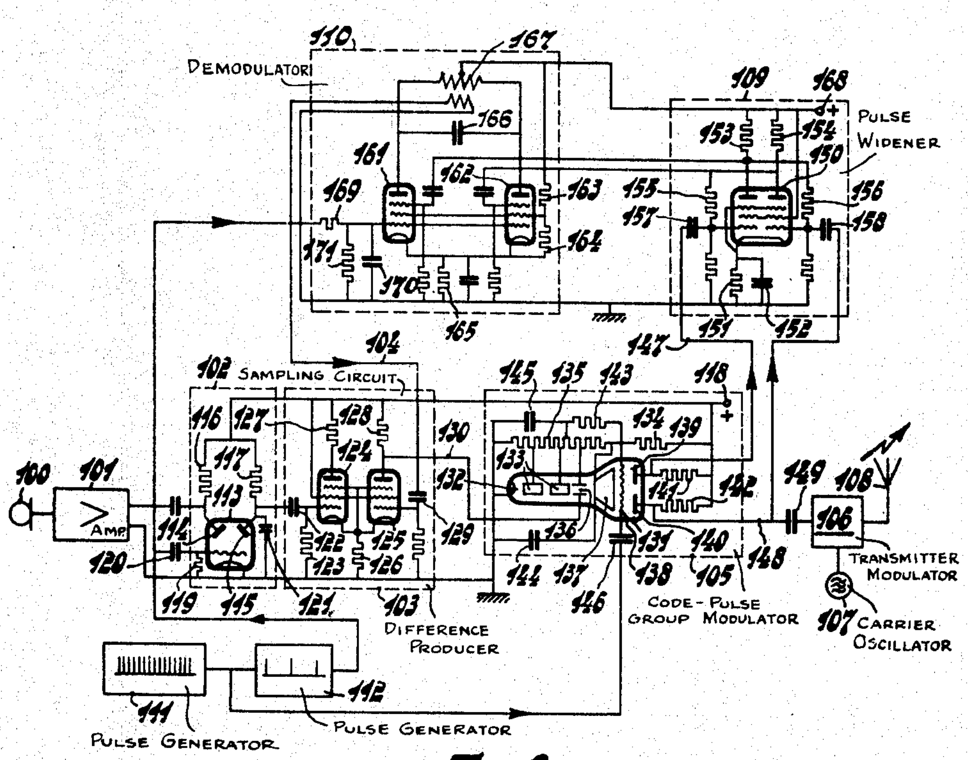

Fig. 6 shows a highly preferred embodiment of a transmitter according to the invention, the design of which materially differs from that of the transmitter shown in Fig. 4.

Figures 7A, 7B:
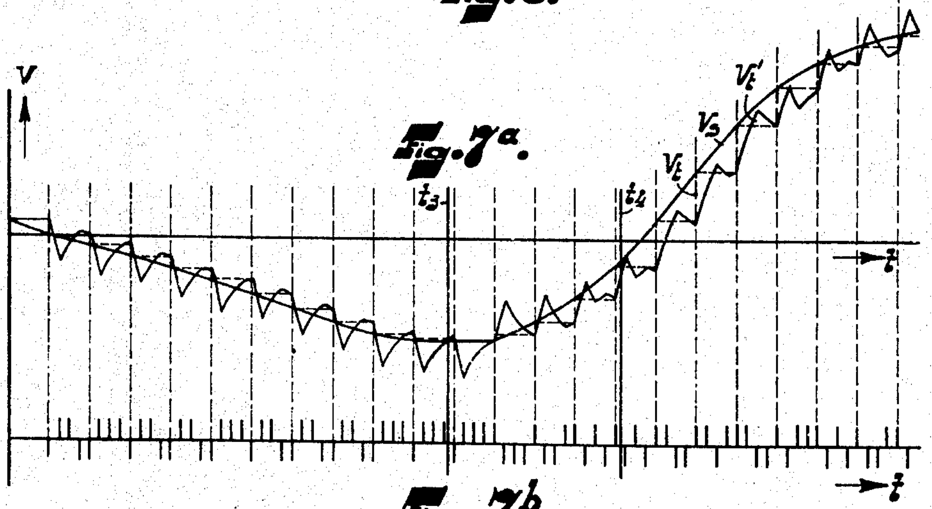

Figs. 7*a* and 7*b* show voltage diagrams and code-pulsegroups respectively to explain the operation of the transmitter of Fig. 6.

Figs. 8*a* to *f* are diagrams explaining the operation of the negative feedback circuit used in the transmitter of Fig. 6.

Figure 9:
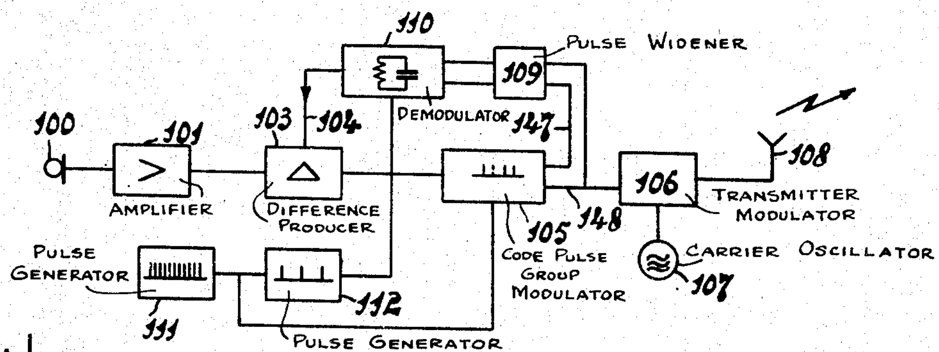
Figures 10A, 10B, 10C:
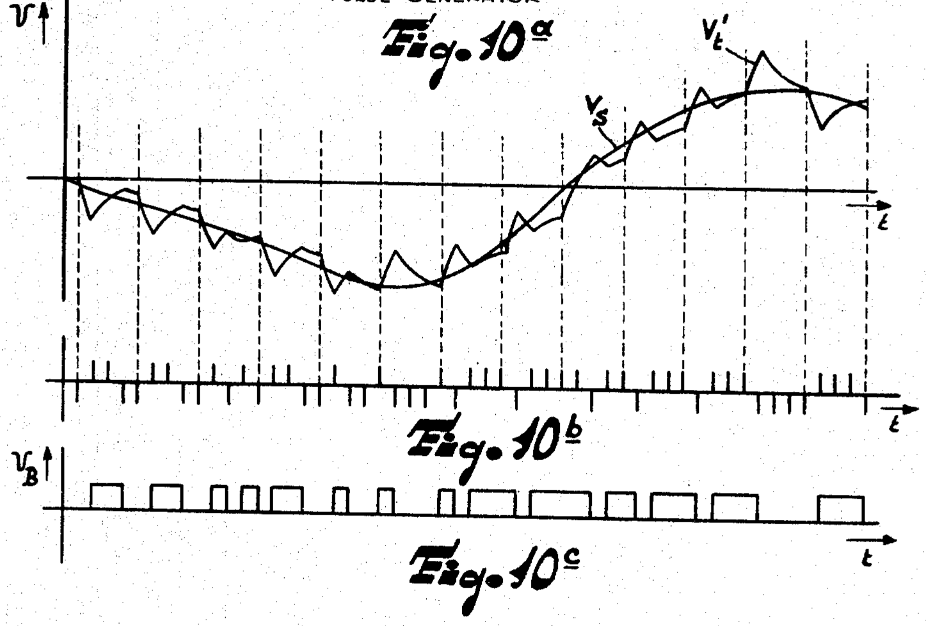

Fig. 9 is a block schematic diagram of a simplified transmitter of the type shown in Fig. 6, the operation of which will be clarified with reference to the voltage diagrams and code-pulsegroups shown in Figs. 10*a* and 10*b*.

Figure 1:
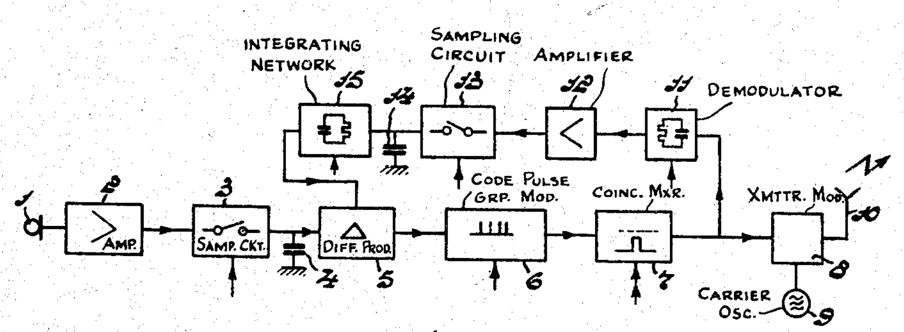
Fig. 1 is a block schematic diagram of a transmitter according to the invention for pulse-group code modulation, in which use is made of a four digit code.
Figure 11:
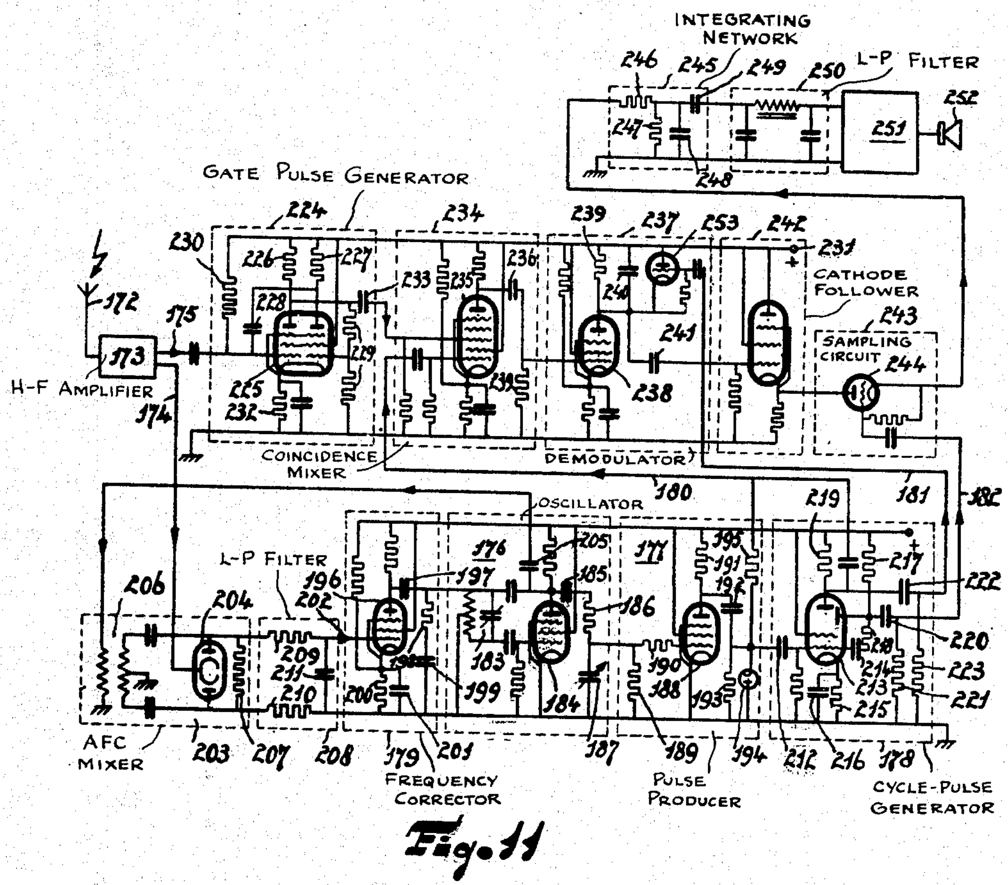

Fig. 11 shows a receiver according to the invention for use in reception of signals transmitted, for example, by a transmitter as shown in Fig. 1 or 4, the operation of the receiver being explained more fully with reference to the diagrams shown in Figs. 12*a* to 12*i*.

Figures 13, 14A, 14B, 14C, 14D, 14E, 14F:
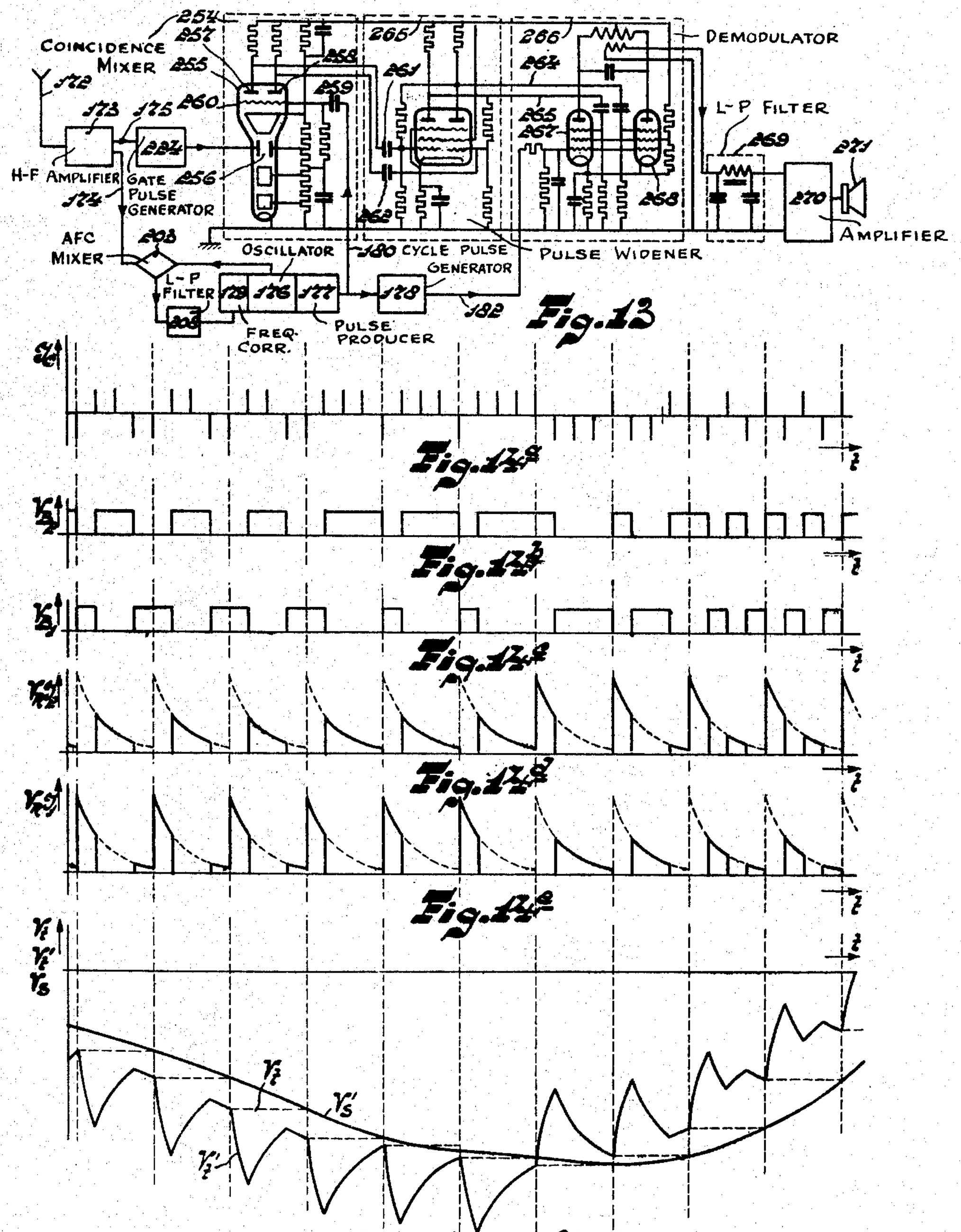

Fig. 13 shows a receiver according to the invention for use with transmitters of the type shown, for example, in Figs. 6 and 9, and Figs. 14*a* to 14*f* show diagrams explaining the operation of this receiver.

In the transmitter shown in Fig. 1, the signals required to be transmitted and provided by a transmitter microphone 1 are fed by way of an amplifier 2 to a sampling circuit 3, with the result that, instead of a voltage variation corresponding to the signal to be transmitted, a voltage following this signal stepwise is produced across a holding condenser 4. The sampling circuit used may be designed differently, as will be set out more fully with reference to the subsequent figures. It will be sufficient here to mention that the sampling circuit is essentially a switch which at equidistant sampling instants is closed for a short period with the result that the holding condenser is charged to a voltage corresponding to the then occurring instantaneous value of the signal to be transmitted and this voltage being maintained till the next sampling instant. The sampling circuit must be caused to become operative in the rhythm of the code-pulsegroups to be transmitted and in view to obtaining this purpose sampling pulses of cycle frequency are fed to the sampling circuit, as denoted in the figure by an arrow.

The voltage of the holding condenser is applied to a difference producer 5, which will be described more fully hereinafter and the output voltage of which is fed, as a control-voltage, to a code-pulsegroup modulator 6. The pulses taken from the modulator 6 are utilized as gating pulses for a coincidence mixture 7, which is supplied in addition with substitution pulses of comparatively short duration, which are supplied to a transmitter modulator 8 connected to a carrier-wave oscillator 9 and an aerial 10.

The produced code-pulsegroups built up from substitution pulses are also fed to a negative feedback circuit which shunts the modulator and which comprises a code-pulsegroup demodulator 11, an amplifier 12, a sampling circuit 13 and a next following holding condenser 14, the voltage of the latter being fed to a network 15 integrating signal frequencies and connected to the difference producer 5. The network 15 integrating signal frequencies has produced across it a voltage which, at least to a first approximation, constitutes, for a material part of the frequency range of the signals required to be transmitted, an approximation to the stepwise signal produced across the holding condenser 4. For this reason the voltage produced across the signal frequencies integrating network is referred to as an approximation signal.

The difference producer 5 has supplied to it the stepwise signal supplied by the holding condenser 4 and the approximation signal for the purpose of producing the difference, the output circuit of the difference producer 5 having thus produced across it a difference voltage which after having been coded with the use of the modulator 6 is transmitted.

The code-pulsegroups used may characterize definite amplitude values in different ways. Assuming with the transmitter of Fig. 1 the use of a four digit code, that is to say of code-pulsegroups which do not comprise more than four equidistant and equal pulses and in which in addition successive pulses in a code-pulsegroup represent amplitude values which increase according to a binary count system.

Figures 2A, 2B:
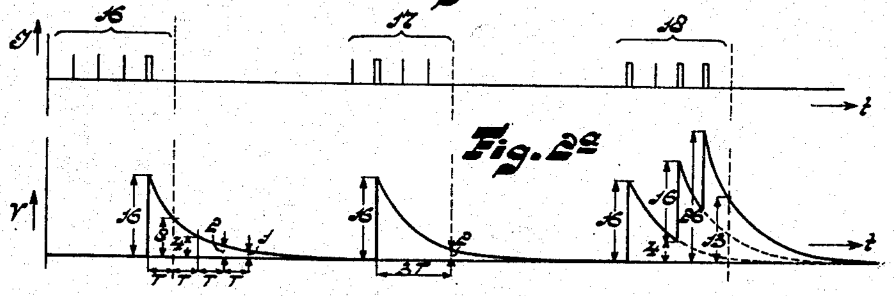
Fig. 2 shows some few examples of code-pulse-groups, such as are tranmitted by the transmitter of Fig. 1 and also a diagram illustrating the voltage variations produced by said code-pulsegroups in a code demodulation circuit suitable for this purpose.

Fig. 2*a* shows, by way of example, three different code-pulsegroups 16 to 18 of the type mentioned in the preceding paragraph. In the first code-pulsegroup 16 the first three pulses are lacking, only the fourth being present. In the second code-pulsegroup 17 the pulses having the sequence numbers 1, 3 and 4 are missing and only the pulse number 2 is present; in code-pulsegroup 18 the pulses numbered 1, 3 and 4 are present, whereas the second pulse is lacking.

Figure 3:
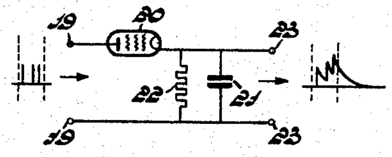
Fig. 3 shows a simplified embodiment of a code-pulsegroup demodulator of the type preferably used in the transmitter shown in Fig. 1.

For converting the code-pulsegroups shown in Fig. 2*a* into the amplitude values characterized by them use is preferably made of a code-pulsegroup demodulator of the type shown in Fig. 3, in which the code-pulsegroups are fed by way of input terminals 19 and a pentode 20 to an integrating network which comprises the parallel combination of a condenser 21 and a resistance 22, the output terminals 23 of the circuit being connected to the integrating network. The time constant of the integrating network 21, 22 is chosen to be such that a voltage produced across the condenser 21 is reduced by half in a time interval corresponding to one period of the pulse recurrence frequency occurring in a code-pulsegroup. Provision is furthermore made for each pulse fed to the circuit-arrangement shown in Fig. 3 to bring about a constant variation of the voltage across condenser 21 of, for example, 16 unit values, irrespective of the voltage that happens to be effective across the condenser.

If the circuit-arrangement shown in Fig. 3, which is designed in this manner, has fed to it the code-pulsegroup designated 16 in Fig. 2*a*, the condenser being assumed to be discharged at the instant of starting this code-pulsegroup, the fourth pulse produces a voltage of 16 units across the condenser 21. This voltage variation is shown in the voltage curve of Fig. 2*b* which represents the variation of the condenser voltage, directly below pulse No. 4 of the code pulsegroup 16. At the end of a time interval T which corresponds to the spacing between successive pulses in a code-pulsegroup the voltage is decreased to a value of 8 units. After a further time interval T the condenser voltage is again halved. A time interval of 3T after the setting up of the pulse a voltage of 2 units only is still effective across the condenser and after 4T a voltage of 1 unit, as shown in Fig. 2*b*.

If the voltage across the network 21, 22 is scanned or sampled each time a period of time T after the instant or pulse No. 4 of a code-pulsegroup, as is denoted diagrammatically in Figs. 2*a* and 2*b* by a vertical broken line, a voltage value 8 is ascertained upon reception of the illustrated code-pulsegroup 16. Upon reception of code-pulsegroup 17, which comprises the second pulse only, a voltage value 2 is ascertained, whereas reception of code-pulsegroup 18 at the sampling instant provides a voltage value 13. Code-pulsegroups comprising four digits may be used in the manner indicated to characterize sixteen different voltage values (inclusive of the zero value) and the characterized voltage values may be taken from a code-pulsegroup demodulator of the kind shown in Fig. 3 with the use of a sampling circuit. Each time upon the occurrence of a code-pulsegroup, that is to say, with the cycle frequency, the sampling circuit used, for example 13 of Fig. 1, must be caused to become operative for a short period and this may be carried out with the use of pulses of cycle frequency. Moreover, provision must be made for the residual charge of the network 21, 22 to be removed each time after the occurrence of a sampling voltage, in order to prepare the code demodulator for the reception of the next following pulsegroup. Arrows in Fig. 1 show the parts of the transmitter to which pulses of cycle frequency are required to be fed, the double arrow at mixing stage 7 denoting the supply thereto of pulses of higher recurrence frequency.

Fig. 4 is a diagrammatic detail view of the transmitter shown in block diagram form in Fig. 1, those parts of the transmitter equipment which are of minor importance for an understanding of the invention and which are known per se being, however, not shown in detail.

The signals required to be transmitted from a transmitter microphone 24 are fed by way of an amplifier 25 to a sampling circuit 26. This sampling circuit comprises two triodes 27 and 28 connected in parallel and in opposite senses and of which the control-grids are connected to grid leaks 29 and 30 respectively and, through grid condensers 31 and 32 respectively to one end of secondary windings 33 and 34 respectively of a transformer, whereas the other ends of the secondary windings are connected to the cathodes of the triodes 27 and 28 respectively. Fed to the primary winding 35 of the transformer are sampling pulses of the cycle frequency required for the code-pulsegroups, which across the secondary windings produce voltage pulses which bring about the occurrence of grid current in the triodes 27, 28. These voltage pulses bring about a charge of the grid condensers 31, 32 to a voltage such that, in the absence of sampling pulses, the triodes are cut off.

Upon each occurrence of a sampling pulse a kind of short-circuit is produced between the input and output sides of the sampling circuit 26, with the result that a holding condenser 36 following the sampling circuit is given a positive or negative voltage which corresponds to that instantaneous value of the signal voltage taken from the amplifier 25 which prevails at the sampling instant. In Fig. 5*a*, the curve $V_s$ represents the signal voltage taken from the amplifier 25 and the stepwise curve $V_t$ the consequential voltage across the holding condenser 36.

The sampling pulses of cycle frequency fed to the primary winding 35 of the sampling circuit 26 are taken, as shown diagrammatically by a dot-and-dash line from a pulse generator 38, which is tuned to the cycle frequency and which is coupled to a pulse generator 39 so as to allow the passage of only one pulse to every five pulses supplied by the pulse generator 39. The pulse generator 39 is thus tuned to a pulse recurrence frequency, which is five times the cycle frequency and which corresponds to the recurrence frequency of the pulses in a code-pulsegroup. The ratio of the pulse frequencies of the generators 38 and 39 is chosen in the manner described in order to permit of inserting between two successive code-pulsegroups a synchronizing pulse to be used especially for synchronization purposes, while at the same time all the emitted pulses coincide with pulses of a series of equidistant pulses, as taken from the pulse generator 39.

The voltage $V_t$ varying stepwise and occurring across the holding condenser 36 is fed to a difference producer 40, to which is also fed, through a conductor 41, an approximation signal taken from the negative feedback circuit. The difference producer comprises an output resistance 42, of which one end is earthed, whereas the other end is connected by way of resistances 43 and 44 respectively to the holding condenser 36 and the negative feedback circuit respectively. The resistances 43 and 44 have a value which is high compared with that of resistance 42 so as to prevent undue coupling between holding condenser and feedback circuit.

The difference voltage across the output resistance 42 is coded in a code-pulsegroup modulator 45. The modulator comprises a cathode-ray tube 46, which is especially designed for this purpose and which is of a kind known per se. (cf. article of R. W. Sears, "Electron Beam Deflection Tube for Pulse Code Modulation" in "The Bell System Technical Journal," January 1948, pages 44 to 57). In view thereof a short description below of the code modulator 45 and its operation may suffice.

The coding tube 46 comprises means 47 for producing an electron beam which may be deflected into two directions at right angles to one another with the use of vertical deflecting plates 48 and horizontal deflecting plates 49. The tube comprises in addtiion a collector 50, a quantizing grid 51, a coding mask 52 and an anode 53, the latter being connected by way of an anode resistance 54 to a source of anode voltage (not shown) and, moreover, by way of a coupling condenser 55, to the output lead 56 of the modulator.

The vertical deflecting plates 48 are connected to a deflection-voltage amplifier 57, to which is fed as a control-voltage the difference voltage taken from the resistance 42 of the difference producer 40. The electron beam produced in the coding tube 46 is thus deflected in a vertical direction in accordance with the polarity and value of the difference voltage and impinges on the quantizing grid 51 at a certain arbitrary level. The quantizing grid 51 is made of horizontal grid wires which are coated with a material emitting secondary electrons, the electron beam being allowed to pass between the wires. As soon as the electron beam strikes a given wire, secondary electrons travel from this wire to the collector 50, which has a suitable potential and, by way of a negative feedback lead 58 a negative feedback voltage is supplied to the amplifier 57 for the vertical deflection voltage, with the result that the electron beam is adjusted in a vertical direction so as to pass exactly between two grid wires. A difference voltage fed to the deflection-voltage amplifier 57 is, consequently, capable of producing only a restricted number of vertical deflections of the cathode-ray beam, or in other words the difference voltage is quantized as to amplitude with the result that any amplitude value is converted into a value corresponding to the nearest permissible amplitude level. The number of amplitude levels must correspond to the number employed of digits of the pulsegroup code and is 16 with the assumed use of a four digit code.

After passing through the quantizing grid 51, the electron beam strikes the coding mask 52 at a given level determined by the quantized difference voltage and may be moved in a horizontal direction over the coding mask 52 by a sawtooth deflection voltage with the use of a horizontal deflection-voltage generator and amplifier 59 and the horizontal deflecting plates 59 connected thereto. The coding mask comprises apertures which during the horizontal scan furnish the desired pulsegroup characterizing a definite amplitude level as a function of the scanning level, it being possible for the code-pulsegroups produced to be taken from the anode arranged behind the coding mask 52. Correct operation of the code-pulsegroup modulator described requires the supply of pulses if cycle frequency taken from the pulse generator 38 to the means 47 for producing the electron beam and to the deflection voltage amplifiers 57 and 59 for the periodical suppression of the cathode-ray beam and the synchronization of its movement with the cycle frequency respectively.

The code-pulsegroups taken from the modulator 45 are composed of pulses of which the duration, form and amplitude vary with the structural form of the modulator 45 and the manner of arranging its connections. Due to many circumstances, the pulses forming a code-pulsegroup may exhibit divergences relatively to the desired pulses, in view of which it has proved desirable to replace the pulses taken from the modulator 45 by other pulses of which the duration, form and amplitude vary with fewer factors. For this purpose the pulses taken from the modulator 45 are fed to a coincidence mixer 60, which is also connected to the pulse generator 39.

The coincidence mixer 61 comprises an amplifying tube 61 of the hexode type, which is normally cut off by a negative grid bias which is taken from a potentiometer comprising a resistance 62 and a capacitatively shunted cathode resistance 63. To the first control-grid of the hexode 61 are fed, by way of conductor 64, the positive-going pulses taken from the pulse generator 39. However, the bias voltage of the tube is chosen to be such that, in the absence of a positive control voltage at the second control-grid of the tube 61 the positive pulses at the first control-grid are not capable of deblocking the tube. The pulses taken from the anode 53 of the coding tube 46 are negative-going and exhibit flanks of comparatively low slope. With the use of a differentiating network comprising a condenser 55 and a resistance 65 the said pulses are converted into pairs of pulses, of which the first is a negative-going and the second a positive-going pulse. These pulse pairs occurring across the resistance 65 are fed to the second control-grid of the hexode 61. As a matter of course, negative pulses cannot render the hexode conducting. Deblocking of the tube only takes place upon supply of positive pulses to the second control-grid, if the substitution pulses of comparatively short duration supplied to the first control-grid coincide with them. An anode resistance 66 has thus produced across it negative-going substitution pulses which with the use of a further differentiating network comprising a condenser 67 connected to the anode of the tube 61 and a resistance 68 one end of which is earthed, are converted into pairs of pulses composed of a positive and a negative pulse of very small width. Only the positive pulses of the latter pulse pairs will be taken into consideration hereinafter, since the negative pulses are ineffective in the further equipment.

The pulses taken from the coincidence mixer exhibit the code given by the code-pulsegroup modulator and are fed, by way of a conductor 69, to the transmitter modulator. This transmitter modulator is not shown in the figure, since its details are unimportant for the present invention.

By way of a conductor 70 the sequence of code-pulsegroups taken from the coincidence mixer 60 is also supplied to a negative feedback circuit the input of which is formed by a code-pulsegroup demodulator 71. The code-pulsegroups supplied to it are denoted in Fig. 5b by the small amplitude pulses shown therein. The longer pulses shown in Fig. 5b represent the emitted synchronizing signals, which, however, are not supplied through lead 70 to the demodulator. The synchronisation signals will be recurred to hereinafter.

The code-pulsegroup demodulator 71 is of the kind already described with reference to Fig. 3 and comprises an amplifying tube 72 of the pentode type, which is normally cut off by a negative grid bias taken from a potentiometer comprising a resistance 73 and a capacitatively-shunted cathode resistance 72. The anode circuit of the tube 72 includes a network comprising the parallel combination of an anode resistance 75 and a condenser 76, the time constant of this parallel combination being such that, when the tube 72 is cut off, a voltage occurring across the condenser decays to half its original value in a time interval corresponding to one period of the recurrence frequency occurring in a code-pulsegroup. The code-pulsegroups are fed, through lead 70, to the control-grid of the pentode 72, the individual pulses periodically causing the pentode to become conducting and thus bringing about the supply of a definite charge to the condenser 76, a charge which is independent of the voltage across the condenser. Produced in the manner fully described with reference to Figs. 2 and 3 across the condenser 79 is thus upon each reception of a code-pulsegroup, a voltage which corresponds to the composition of the code-pulsegroup received. The condenser 76 is connected in parallel with a triode 77, the function of which is to discharge the condenser 76 upon each reception of a code-pulsegroup so as to prepare the code demodulator for the reception of the next following code-pulsegroup. The discharge of the condenser 76 must therefore occur in the rhythm of the cycle frequency and for this purpose pulses of cycle frequency taken from the pulse generator 38 are fed to the control-grid of the triode. These pulses are supplied through a grid condenser 78 to the control-grid of the triode which is connected to the cathode by way of a grid-leak resistance 79. A pulse fed to the control-grid causes grid current to pass through the triode with the result that the grid condenser 78 becomes charged to such extent that the triode is cut off between successive control pulses.

The alternating voltage occurring across condenser 76 of integrating network 75, 76 of the code demodulator is fed to the control-grid of a cathode follower 81 by way of a coupling condenser 80. The output voltage is taken from cathode resistance 82 and, by way of a condenser 83, which serves to remove the direct current component of the said output voltage, is fed to an output resistance 84. The output resistance 84 of the cathode amplifier 81 is earthed at its lower end and connected at its upper end to the input terminal of a sampling circuit 85. This sampling circuit 85 is formed in exactly the same manner as the sampling circuit 26 described above and is also controlled by pulses of cycle frequency, which are taken from the pulse generator 38. This sampling circuit is periodically rendered operative by a sampling pulse some time after the reception of a code-pulsegroup, with the result that the voltage occurring across resistance 84 is supplied to a holding condenser 86 connected to the output of the sampling circuit. The holding condenser 86 is shunted by a resistance 87 which is provided with an earthed mid-point tapping and constitutes a balanced input resistance of a device 88 comprising a signal-frequencies integrating network. The signal frequencies integrating network comprises an integration condenser 89 which is shunted by the primary winding of a transformer 90. The integration condenser 89 with the primary winding 90 connected in parallel therewith, is connected between the anodes of two push-pull connected hexodes 91, 92, the anodes being connected by way of a mid-point tapping of the primary winding to the positive terminal 93 of a source of anode voltage. The anode circuit of the push-pull connected tubes 91, 92 is tuned to a frequency which is preferably lower than the lowest signal frequency to be transmitted. The tubes 91, 92 are normally cut off by means of a negative grid-bias taken from a voltage divider with resistances 93, 94 and a capacitatively shunted cathode-resistance 95. The first control-grids of the tubes 91, 92 are connected in parallel and connected, by way of a coupling condenser 96, to the pulses of the pulse generator 38 supplying the cycle frequency. The negative grid-bias of the hexode is chosen to be such that in the absence of a positive control voltage at the second control-grid, the pulses supplied to the first control-grids are unable to deblock the tubes. When a positive voltage appears at the holding condenser 86, the second control-grid of tube 92 receives a positive control voltage, whereas the second control-grid of tube 91 receives a negative control voltage. A cycle pulse then supplied to the parallel-connected first control-grids deblocks the hexode 92 to a degree depending upon the voltage set up at the second control-grid. Owing to this a charge is supplied to the integration condenser 89, which depends upon the voltage set up at the holding condenser 86. Due to the negative voltage set up at the second control-grid of the hexode 91 the latter remains cut off.

If a negative voltage is supplied to the holding condenser 86, the reverse is true. In this event the hexode 92 remains cut off and the hexode 91 brings about that from the integration condenser 89 a charge is carried away which corresponds to the voltage set up at the holding condenser 86.

Fundamentally, the signal frequencies integrating network 89, 90 functions as a "memory" network. As a result of the high time constant of the network a voltage set up at the integration condenser 89 is maintained practically unchanged between the occurrence of cycle pulses, and on the appearance of a cycle pulse the voltage increase or decreases every time by a given amount in accordance with the voltage set up at the holding condenser 86, which voltage in turn corresponds to the voltage taken from the output resistance 42 of the difference producer 40. In this manner a step-by-step varying voltage is set up at the integration condenser 89, which voltage is designated $V'_t$ in Fig. 5*a* and supplied, by way of a secondary winding 97 coupled with the integrating network, as an approximation signal to the difference producer 40.

The variation of the approximation signal $V'_t$ corresponds to the step-by-step varying signal $V_t$ derived from the signal to be transmitted and appearing at the holding condenser 36. However, the amplitude levels at a voltage $V_t$ are liberal, but the amplitude levels of the approximation signal $V'_t$ are quantized and, moreover, the voltage $V'_t$ with respect to the voltage $V_t$ is delayed by a duration which should be slightly smaller than one cycle of the cycle frequency.

The operation of the arrangement so far described and shown in Fig. 4 may be summarized as follows:

The sampling circuit 26 following the signal amplifier 25 becomes operative at an instant $t_1$ midway between the appearance of two succeeding code-pulsegroups, as a result of which the voltage set up at the holding condenser 36 rises to a value $A_1$ and is supplied to the difference producer 40. At this instant an approximation voltage of a value $A'_1$ prevails at the signal frequencies integrating network and a positive difference voltage is set up at the output resistance 42 of the difference producer, which difference voltage is supplied to the code-pulsegroup modulator 45. In the modulator 45 a code-pulsegroup corresponding to this difference voltage is produced, which group characterizes the nearest amplitude level for the difference voltage. In the code-pulsegroup demodulator 71 the code-pulsegroup obtained is converted into the quantized difference voltage, so that after reception of the code-pulsegroup in question and operation of the sampling circuit 85 included in the negative feedback circuit, the quantized difference voltage appears at the holding condenser 86. After the sampling circuit 85 has become operative the demodulator 71 in the negative feedback circuit is caused to resume its initial position by a pulse of cycle-frequency, the arrangement 88 including the signal frequencies integrating network 89, 90 being operated practically simultaneously. The amplitude of the approximation signal set up at the signal frequencies integrating network, which signal is supplied to the difference producer 40, consequently increases by the quantized difference voltage transmitted to the negative feedback circuit and this to a value $A'_2$. About at the same time the sampling circuit 26 following the signal amplifier 25 becomes again operative and the voltage $V_t$ assumes a value $A_2$, whereupon the cycle described is repeated.

The actuation of the sampling circuits 26 and 85, of the circuit-arrangement 88 including the signal frequencies integrating network and of the discharge triode 77 in the code-pulsegroup demodulator 71 should be effected in the aforesaid sequence in the time interval between two succeeding code-pulsegroups, and for this reason one or more of these elements must be connected to the cycle-pulse generator 38, eventually through delaying networks known per se. In view thereof the connections of the pulse generator 38 to the said elements and to the code-pulsegroup modulator 45 are shown only diagrammatically by dot-and dash-lines.

Between every two succeeding code-pulsegroups such a time interval is provided that a synchronisation pulse can be transmitted therein. These synchronisation pulses are produced by a pulse-generator 98 which is tuned to half the cycle-frequency and is designed and coupled with the cycle-pulse generator 38 in such manner that only one of every two cycle-pulses is transmitted. The pulses of half the cycle-frequency thus obtained are supplied by way of a lead 99 to the transmitter-modulator (not represented) where they are combined with the code-pulsegroups appearing at the lead 69, with the result that the transmitted pulses appear as shown in Fig. 5*b*. The longer pulses in Fig. 5*b* are located between every two code-pulsegroups and indicate the instants for the synchronisation pulses. Of these longer pulses only those shown in full lines are transmitted as synchronisation pulses, whereas the pulses represented by dotted lines are not transmitted. For the sake of clearness the synchronisation pulses in Fig. 5*b* are shown with an amplitude different from the remaining pulses. It is emphasized, however, that all pulses transmitted are exactly equal and coincide with equidistant pulses derived from the pulse generator 39.

It is clear that different forms of a transmitter of the type shown in Fig. 4 are possible without departing from the scope of the invention. For instance, the code-pulsegroup modulator may be designed for a code-system with a larger or smaller number of digits. Alternatively, the function of a given element of the arrangement represented may sometimes be taken over by another element. For instance, the function of the sampling circuit 85 included in the negative feedback circuit may be taken over by the arrangement 88 including the signal-frequencies integrating network. Another possible modification consists in shifting the sampling circuit 26 next to the signal amplifier 25 to the outgoing lead of the difference producer 40. Furthermore it is clear that the represented circuit elements may, in themselves, be different from those shown in Fig. 4. Thus, for instance, the code-pulsegroup demodulator may be constructed as a push-pull circuit, and the code-pulsegroup modulator may be replaced by an analogous optical system. In general, however, purely electronic devices are to be preferred in connection with the high pulse recurrence frequency to be used. In the aforesaid arrangement a satisfactory quality of transmission for a maximum signal frequency of 3400 c./s. is, for instance, ensured with the use of a cycle frequency of 14 kc./s., which means that the recurrence frequency of the transmitted pulse train is 70 kc./s.

It is pointed out that, as appears from Fig. 5*a*, due to the use of the signal frequencies integrating network the maximum amplitude of the transmitted difference voltage is much smaller than the maximum amplitude of the signal to be transmitted which, in comparison with the normal method of transmitting signals by means of code-pulsegroups assumed to be known, permits a considerable reduction of the number of amplitude levels to be transmitted with the same quality of transmission. On the other hand the variation, according to time, of the signal voltage should not exceed a given maximum value to enable faithful transmission. Since, in general, the lower signal frequencies exhibit a larger amplitude than the higher signal frequencies, this is not objectionable and the advantage is obtained that the amplitude range of the transmitter is utilised to advantage substantially evenly with all signal frequencies. This even transmitter load may be promoted by the use of a further signal frequencies-integrating network having a suitable chosen time constant in the negative feedback circuit, for example in the conductor 41. For instance, the limiting frequency of the said signal frequencies-integrating network may be chosen to be approximately 1000 c./sec., which value has been proved justified in practice for telephony purposes.

Fig. 6 represents a transmitter according to the invention which, in essentials, is very different from that shown in Fig. 4, notably in relation to the elements used. For the sake of simplicity it is assumed that the synchronisation signals are transmitted separately.

The transmitter shown in Fig. 6 comprises a signal amplifier 101 operated through a transmitter microphone 100, of which amplifier the output voltage is supplied, by way of a sampling circuit 102, to a difference producer 103 to which, also through a lead 104, an approximation signal derived from a negative feedback circuit is supplied. The output voltage of the difference producer 103 controls a code-pulsegroup modulator 105, of which the output pulses are supplied on the one hand to a transmitter modulator 106 having a carrier-wave oscillator 107 connected thereto, and on the other hand to a negative feedback circuit shunting the code modulator 105. The negative feedback circuit comprises in succession a pulse widener 109 and a code-pulsegroup demodulator 110 comprising a signal frequencies integrating network. Moreover, the transmitter comprises a pulse generator 111 producing the pulses forming a code-pulsegroup, and a pulse generator 112 which is coupled therewith and supplies pulses of cycle frequency.

The transmission system shown in Fig. 6 will now be discussed in detail.

The sampling circuit 102 comprises an electron-discharge tube 113 having a cathode, a control grid and two secondary-emission anodes 114, 115, the latter being connected across anode resistances 116, 117 of, say, 0.5 megohm to the positive terminal 118 of a source of anode potential (not represented). The control grid of the tube 113 is connected to a grid leak resistance 119 and a grid condenser 120, through which condenser pulses of cycle frequency derived from the pulse generator 112 are supplied. Whenever a cycle pulse appears, the tube 113 takes grid current, as a result of which the grid condenser 120 is charged to such a degree that the tube is cut off between succeeding cycle pulses. The tube 113 carries anode current only during the appearance of the cycle pulses or sampling pulses. The anode 114 is coupled with the output circuit of the signal amplifier 101 and consequently carries the signal voltage. The anode 115 of the tube is connected to a holding condenser 121, of which one electrode is earthed. When the tube 113 carries current, a stream of secondary electrons is produced between the anodes 114 and 115 in accordance with the potential difference set up between the two anodes with the result that when the tube is carrying current, the potential of the anode 115 and consequently the voltage set up at the holding condenser 121 exactly follows the potential of the anode 114. Since, however, the tube 113 carries current only periodically and for a short time, the voltage set up at the holding condenser 121 is unable to follow continuously the voltage taken from the signal amplifier 101, but every time on the appearance of a sampling pulse assumes a value corresponding to the instantaneous value of the signal voltage then occurring.

In Fig. 7*a* the curve $V_s$ shows the variation of the signal voltage fed to the sampling circuit 102, which variation is followed by the step-by-step varying voltage $V_t$ set up at the holding condenser 121.

After removal of the direct current component the step-by-step varying voltage $V_t$ is fed, through a coupling condenser 122, to an input resistance 123 of the difference producer 103. This difference producer consists of a circuit-arrangement comprising two pentodes 124, 125 with a common cathode resistance 126 and separated anode resistances 127, 128, the holding condenser signal being supplied to the control grid of pentode 124 and the approximation signal derived from the negative feedback circuit being supplied, through a coupling condenser 129, to the control grid of the other pentode 125. At the anode resistances 127, 128 a voltage is set up which corresponds to the difference of the two voltages supplied to the difference producer 103. The difference voltage is taken from the anode resistance 128 and supplied, by way of a lead 130, to the code-pulsegroup modulator 105.

The code-modulator 105 comprises a switching tube 131 comprising means for producing an electron beam. These means are indicated diagrammatically by a cathode 132 and two focussing electrodes 133, the latter being connected to different points of a voltage divider comprising resistances 134, 135 and which is connected between the positive terminal 118 of a source of anode potential and earth. The electron beam thus produced passes by the deflection plates 136 and second focussing electrode 137 which is shaped as a truncated cone. Subsequently, it traverses a grid-electrode 138 and, in accordance with the voltage set up at the deflection plates 136, falls on any one of two electrodes 139, 140 which are constructed as secondary-emission auxiliary cathodes and connected, across high-ohmic resistances 141 and 142 respectively, to the positive terminal 118 of the source of anode voltage. One of the deflection plates 136, and the focussing electrode 137, are connected to suitable tapping points of the aforesaid voltage divider 134, 135 and thus receive a direct voltage exceeding the direct voltage of the grid-electrode 138 which functions as anode of the tube, and is likewise connected, across a resistance 143, to a tapping point of the voltage divider 134, 135. The direct voltages applied to the focussing electrode 137 and the anode 138 are smoothed by condensers 144 and 145 respectively.

The switching tube 131 operates as follows: When the electron beam in the tube is directed in such manner as to strike the secondary-emission electrode 139, the secondary electrons dislodged from this electrode will pass to the anode 138, if the potential of the latter exceeds that of the electrode 139, but will return to the electrode 139 of the latter has a higher potential. If the number of primary electrons impinging on the electrode 139 exceeds that of secondary-electrons leaving this electrode and passing to the anode 138, the potential of the electrode 139 will be lower than the potential of the positive terminal 118 of the source of anode voltage. The current then passing to the electrode 139 may be represented by a direct current of positive polarity. If, however, the number of secondary electrons leaving the electrode 139 exceeds the number of primary electrons impinging thereon, a direct current of negative polarity ensues with the result that the potential of the electrode 139 becomes higher than that of the terminal 118. It thus appears that the potential of the electrode 139 may be assumed to depend entirely upon the number of secondary electrons leaving this electrode. Considering the influence of the potential of the anode 138, which potential determines whether or not all or part of the secondary electrons dislodged by the primary electrons return to the electrode 139, it will be clear that, provided the resistance 141 in the circuit of the secondary-emission electrode 139 be sufficient, the potential of the electrode builds up in such manner as to correspond practically to the potential of the anode 138. If the potential of the anode 138 is increased or decreased, the potential of the electrode 139 will immediately follow this change of potential. The anode 138 is connected to the pulse generator 111 by way of a coupling condenser 146, and thus pulses from this generator are transmitted, by way of the anode 138, to the electrode 139, if the electron beam is directed to the last-mentioned electrode. If, however, the electron beam is directed on to the secondary-emission electrode 140 the pulses from the pulse generator 111 will be transmitted to the electrode 140 by way of the anode 138. Consequently, the tube 131 fundamentally acts as a switch with change over contact, pulses supplied thereto being fed either to the electrode 139 or to the electrode 140 in accordance with the voltage set up at the deflection plates.

The direction of the electron beam in the tube is controlled by the difference voltage taken from the difference producer 103 and supplied, by way of the lead 130, to one of the deflection plates 116. In the absence of a difference voltage the electron beam is directed centrally, whereas on the appearance of a difference voltage either the electrode 139 or the electrode 140 is struck in accordance with the polarity of this voltage. The pulses transmitted to these electrodes are derived, by way of leads 147 and 148, from the code modulator 105. In this respect it is sufficient to point out that the pulses appearing in the lead 148 are the code-pulsegroups to be transmitted, which are supplied to the transmitter-modulator 106 by way of a coupling condenser 149. The production of the code-pulsegroups will be more fully explained hereinafter.

The succession of code-pulsegroups transmitted under control of the signal voltage $V_s$ indicated in Fig. 7*a* is illustrated in Fig. 7*b* by the pulses depicted as positive pulses. The first pulses of every code-pulsegroup are recognisable by vertical dotted lines and practically coincide with the leaps of the step-by-step signal appearing at the holding condenser 121.

The transmitted pulses are derived from the pulse generator 111 and the pulses likewise derived therefrom but not transmitted are indicated with negative polarity in Fig. 7*b* and appear in the lead 147. In this manner the positive and negative pulses shown in Fig. 7*b* are separately supplied to the pulse widener designated 109 in this figure. It is to be noted that the different polarity of the pulses as indicated in Fig. 7*b* does actually not occur; both pulse trains are supplied with negative polarity to the pulse widener 109.

The pulse widener 109 comprises two pentode systems with a common cathode-resistance 151 shunted by a smoothing condenser 152, which systems are incorporated in a single tube 150. The pentode systems comprise separate anode resistances 153, 154. Furthermore, the pentode systems are galvanically coupled cross-wise by resistances 155 and 156 respectively connected, in each instance, between the anode of one tube and the control grid of the other. Due to this cross-wise coupling the arrangement, as is known per se, has two stable positions of equilibrium i. e. one in which the first pentode system carries the full anode current and the second system is cut off, and a second position of equilibrium in which the first pentode-system is cut off and the second system passes current. If the arrangement described is in the position of equilibrium in which, for example, the first pentode-system with anode resistance 153 is cut off, negative pulses from the anode 139 of the switching tube 131, which are supplied thereto by way of the coupling condenser 157, will not be effective. If, however, the said pentode-system passes current, a negative pulse supplied thereto will cause the circuit-arrangement to flip over into the other position of equilibrium, whereupon any further negative pulses supplied thereto are unable to change the position of equilibrium then established. Similarly, the negative pulses supplied to the control grid of the second pentode system with anode-resistance 154, cause the arrangement to flip over if the second pentode system passes current.

To make the operation of the pulse widener better understood the code-pulsegroups appearing in Fig. 7b between the instances $t_3$ and $t_4$ are shown on greatly enlarged time scale. In the first code-pulsegroup 159 shown in Fig. 8a the present pulses numbering 2, 3 and 4 characterize the desired amplitude level. These pulses are supplied with negative polarity, by way of the lead 148 and the coupling condenser 158, to the control grid of the right-hand pentode system of the pulse widener 109. The first pulse missing in the transmitted code-pulsegroup 159 is supplied, by way of the lead 147 and coupling condenser 157, to the left-hand pentode system. Prior to the appearance of this code-pulsegroup the left-hand pentode system is carrying current, so that the potential of the anode is low, as indicated by the curve $V_{B1}$ in Fig. 8b. Due to the negative pulse supplied to the left-hand pentode system this system is cut-off and a sudden increase in anode potential occurs, whereas the right-hand pentode system is released. The latter causes an abrupt decrease in anode potential of the right-hand pentode system, which potential is designated $V_{B2}$ in Fig. 8d.

The second pulse of the first code-pulsegroup 159 is supplied as a negative pulse to the right-hand pentode system with the result that the circuit-arrangement flips over due to this system being cut off. This condition is maintained on the occurrence of the third and fourth pulse of this code-pulsegroup, since they are supplied to the right-hand pentode system already cut off and are consequently ineffective.

Of the succeeding code-pulsegroup 160 only the first pulse is transmitted and passed to the right-hand pentode system, where it is ineffective. The missing pulses 2, 3 and 4 of this group are passed through the switching tube 131 to the left-hand pentode system with the result that this system is cut off on the appearance of pulse 2. In this manner the rectangular oppositely varying voltages shown in Figs. 8b, 8d and hereinafter called switching voltages, are set up at the anodes of the two pentode systems. These switching voltages may be imagined to initiate from the pulse trains supplied to the pulse widener, by extending the individual pulses to a duration corresponding to one cycle of the pulse-recurrence frequency appearing in one code-pulsegroup. In this respect it is emphasized that it is advantageous, but not necessary, to widen the individual pulses to the aforesaid high degree. The widening of the individual pulses may even entirely be omitted. However, in the circuit-arrangement shown in Fig. 6, for feeding the code-pulse group demodulator, the transmitted pulse train should be available with definite polarity and the train of pulses missing therein should be available with opposite polarity in view of the code-pulsegroup demodulator 110 designed as a push-pull circuit arrangement.

Figures 8A, 8B, 8C, 8D, 8E, 8F:
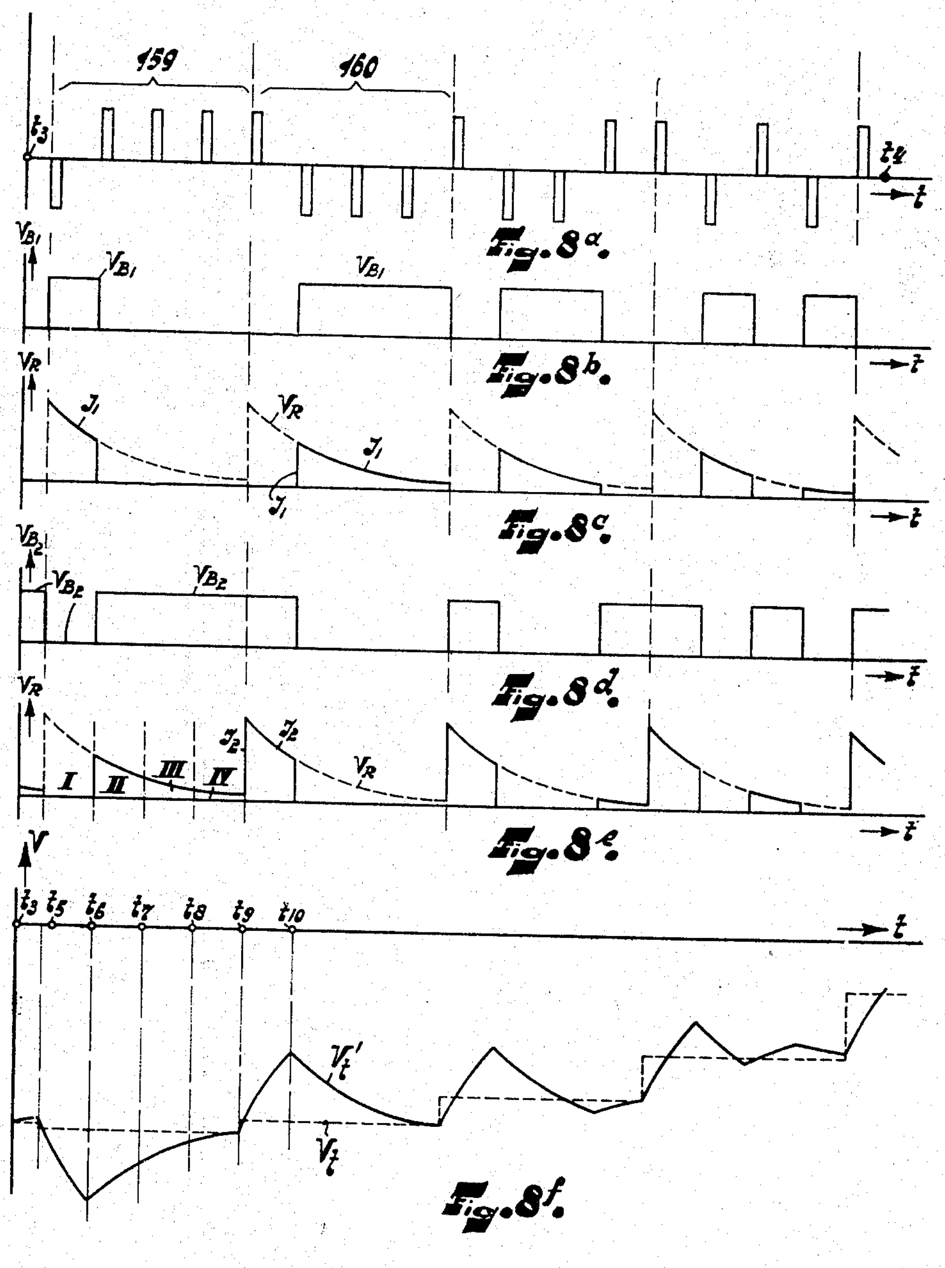

The code-pulsegroup demodulator 110 shown in Fig. 6 comprises two pentodes 161 and 162 which, in the absence of control voltages on the control- and suppressor-grids, are just cut-off by a negative grid bias which is taken from a voltage divider composed of resistances 163, 164 and a capacitatively shunted cathode resistance 165. The switching voltages set up at the anode resistances 153 and 154 in the pulse widener 109 are supplied to the suppressor grids of tubes 161, 162 respectively. These voltages are shown in Figs. 8b and 8d. The anodes of pentodes 161 and 162 are connected in push-pull arrangement to a signal frequencies integrating network consisting of the parallel-connection of an integration condenser 166 and the primary winding 167 of an output transformer of the code-demodulator 110. A mid-point tapping of the primary transformer winding 167 is connected to the positive terminal 168 of a source of anode voltage (not represented).

The control grids of pentodes 161, 162 are connected in parallel and coupled, by way of a grid-current limiting resistance 169 to the cycle-pulse generator 112. On the occurrence of a cycle pulse of positive polarity, grid current is produced in the pentodes 161, 162 thus charging a condenser 170 included in the control-grid circuit, to a voltage which corresponds to the voltage set up at the cathode resistance 165 but is of opposite polarity. The condenser 170 is shunted by a leakage resistance 171. The value of the time constant of the parallel-connection 170, 171 is chosen to be such that a voltage set up at the condenser 170 decays to one half of its original value in a time which equals to one cycle of the recurrence frequency occurring in a code-pulsegroup. The variation of the voltage thus set up at the condenser 170 is indicated partly in dotted lines in Figs. 8c and 8e. The charging of the condenser 170 coincides everytime with the beginning of the code-pulsegroups shown in Fig. 8a and subsequently decreases exponentially. Owing to the properties inherent to the discharge of a condenser according to an exponential curve, the ratio between the surface areas denoted I, II, III, IV in Fig. 8c, which are laterally bounded by equidistant lines coinciding with the front flanks of the pulses shown in Fig. 8a, is a binary count system viz. 8:4:2:1.

The voltages shown in Figs. 8c and 8e function as control voltages for the pentodes 161, 162 and cause a corresponding variation of the anode currents of these tubes insofar as they are released by the switching voltages shown in Figs. 8b and 8d and supplied to the suppressor grids. The anode current pulses appearing in the pentode 161 due to the combined action of the switching voltage shown in Fig. 8b and the control voltage shown in Fig. 8c are represented by full lines $I_1$ in Fig. 8c. The same holds for the pentode 162 in Fig. 8e at $I_2$. Assuming that the pentode 161 causes the integration condenser 166 to be charged, whereas the pentode 162 causes it to discharge, it is clear that a given code-pulsegroup brings about a charge variation which corresponds to the amplitude level characterized by the code-pulsegroup according to a binary count system. In fact, the missing first pulse of the code-pulsegroup 159 causes a discharge of the integration condenser by eight units. The second, third and fourth pulses in the code-pulsegroup 159 cause the integration condenser to be charged by four, two and one unit respectively, so that on reception of the code-pulsegroup 159 the charge of the integration condenser decrease by one unit. Similarly, the reception of the code-pulsegroup 160 results in charging the integration condenser by eight units and discharging it by four, two and one unit respectively from which an increase in charge by one unit results. In Fig. 8f the variation of the voltage at the integration condenser 166 (approximation signal) is illustrated by the curve $V'_t$ in full lines which is formed on receiving in succession the pulses shown in Fig. 8a. The approximation signal is supplied to the difference producer 103 where it is compared with the holding condenser signal which, in Fig. 8f, is represented by the step-by-step curve $V_t$ indicated in dotted lines. Considering the situation at the instant $t_5$ it appears that the approximation signal $V'_t$ from the negative feedback circuit is positive in comparison with the holding condenser signal, so that a positive difference voltage appears in the difference producer 103. This voltage is fed with reversed polarity to the lower-most of the deflection plates 136 of the switching tube 131 in the code-pulsegroup modulator 105 with the result that the electron beam in the switching tube is directed on to the anode 139 and the voltage pulse derived at this instant from the pulse generator 111 is transmitted, by way of the lead 147 and coupling condenser 157, to the left-hand pentode system of the pulse widener 109, in accordance with the first pulse of the code-pulsegroup 159 shown in Fig. 8a. Due to this pulse the voltage set up at the integration condenser 166 gradually decreases till the instant denoted $t_6$ in Fig. 8f and this by eight units. Owing to the voltage decrease at the integration condenser 116 the polarity of the difference voltage is reversed, as appears from Fig. 8f. Since the electron beam in the switching tube 131 is now directed on to the electrode 140, the pulse of pulse generator 111 occurring at the instant $t_6$ is transmitted to the lead 148 and thus transmitted and at the same time passed by way of the coupling condenser 158, to the right-hand pentode system of the pulse widener 109, in accordance with the pulse No. 2 of code-pulsegroup 159 represented as a positive pulse in Fig. 8a. During the subsequent time interval $t_6$—$t_7$ the voltage set up at the integration condenser 116 increases by four units, but this is not sufficient to cause the polarity of the difference voltage to be reversed. In this manner the pulse coming from the pulse generator 111 at the instant $t_7$, similarly to the previous pulse, is supplied to the anode 140 of the switching tube which involves a further increase by two units of the voltage set up at the integration condenser during the interval $t_7$—$t_8$. At the instant $t_8$ also the difference voltage still has the same polarity as at the time of the two previous pulses with the result that pulse 4 of code-pulsegroup 159 is likewise transmitted.

Just before the instant $t_9$, coinciding with the beginning of the following code-pulsegroup 160, the difference voltage has become nil. Due to the sampling circuit 102 becoming operative, however, the holding condenser voltage increases by a small amount, as a result of which the difference voltage at the instant $t_9$, just as at the three preceding instants $t_6$, $t_7$ and $t_8$, is negative so that the first pulse of code-pulsegroup 160 is transmitted. Owing to this the integration condenser is charged till the instant $t_{10}$ by eight units and the polarity of the difference voltage is reversed, so that the following pulses of code-pulsegroup 160 are suppressed. The cycles described are repeated with the cycle frequency and so the production of the further code-pulsegroups shown in Fig. 8a need not be described in greater detail. It is still pointed out that in the transmitter shown in Fig. 6 the time of delay, throughout the negative feedback circuit, should be smaller than the time interval of successive pulses of a code-pulsegroup.

In the transmission system under view a four digit code is used and successive pulses in a code-pulsegroup represent amplitude values decreasing according to a binary count system, which is just the reverse as in the transmitting arrangement shown in Fig. 4. This choice permits, in connection with the negative feedback coupling according to the invention, the code-pulsegroup modulator 105 to be constructed as a switching tube and furthermore the code-pulsegroup demodulator 110 to be combined with the signal frequencies integrating network, whilst a sampling circuit in the negative feedback circuit can be dispensed with.

In addition, the transmission system shown in Fig. 6 has the advantage that the used number of digits can be changed in a particularly simple manner. In fact, it is sufficient to alter the repetition frequency of pulse generator 111 in proportion to the number of digits and furthermore it is required to alter the time constant of the network 170, 171 producing the control voltage required in the code demodulator. Otherwise, however, the circuit-arrangement may remain unchanged.

Another particular advantage of the transmission system shown in Fig. 6 is a considerable simplification in relation to synchronization of the various elements. In the circuit-arrangement, in effect, cycle pulses are supplied only to the sampling circuit 102 and the code demodulator 110, whereas the pulses from the pulse generator 111 are only supplied to the code modulator 105. To the code modulator, in contradistinction to that shown in Fig. 4, no pulses of cycle frequency are supplied.

In the transmitter shown in Fig. 6 the pulse widener 109 and the code-pulsegroup demodulator 110 included in the negative feedback circuit are each constructed as a push-pull circuit-arrangement. One or both of these elements may not be constructed as a push-pull circuit-arrangement. In this event the pulse widener should be constructed as a circuit-arrangement having only a single state of equilibrium, for example as a so-called "one-shot-multivibrator." It is also possible to maintain the push-pull construction of the pulse widener 109 and to use only one of the two tubes of the code-pulsegroup demodulator.

Fig. 9 is a block diagram of a simplified transmitter of the type shown in Fig. 6, wherein the elements corresponding to those shown in Fig. 6 bear the same reference numerals. The transmitter shown in Fig. 9 is different from that shown in Fig. 6 in that the only sampling circuit present in Fig. 6 has been omitted, whereby the operation of the transmission system is greatly altered.

In the transmitter shown in Fig. 9 the signals from a transmitter microphone 100 are supplied, through a signal amplifier 101 without the intermediary of a sampling circuit, to a difference producer 103 ($V_s$ in Fig. 10*a*), to which also an approximation signal ($V'_t$ in Fig. 10*a*) from the negative feedback circuit is supplied by way of the lead 104. The difference voltage from the difference producer 103 controls a code-pulsegroup modulator 105 with outgoing leads 147 and 148. In the outgoing lead 148 the train of code-pulsegroups to be transmitted appears, which are supplied to a transmitter modulator 106 to which a carrier-wave oscillator 107 and antenna 108 are connected. The pulse train supplied to the transmitter modulator by way of the lead 148 is represented by pulses of positive polarity in Fig. 10*b*. The pulses missing in this pulse train appear in the outgoing lead 147 and are indicated with negative polarity in Fig. 10*b*. Both trains of pulses are separately supplied with the same polarity to a pulse widener 109 which is included in the negative feedback circuit and of which the output switching voltages control a code-pulsegroup demodulator 110 with a signal frequencies integrating network in push-pull arrangement. The output voltage of the signal frequencies integrating network of the code-demodulator 110 constitutes the approximation signal $V'_t$ supplied to the difference producer 103 by way of the lead 104. The transmitter again comprises two pulse generators 111, 112 which are intercoupled and serve for supplying the pulses forming the code-pulsegroups (recurrence frequency 56 kc./sec., for example) and pulses of cycle frequency (for example 14 kc./sec.) respectively. The pulses from the pulse generator 111 are supplied to the code-pulsegroup modulator 105, the pulses from the cycle-pulse generator 112 being supplied to the code-pulsegroup demodulator 110 for producing the control voltage required therein.

The detail construction of the elements shown in Fig. 9 may be exactly identical with that of the corresponding elements in Fig. 6. The absence of the sampling circuit between the signal amplifier 101 and the difference producer 103 in the transmitter of Fig. 9 involves, however, that now in the difference producer the signal $V_s$ shown in Fig. 10*a* is compared directly with the approximation signal $V'_t$ also shown in Fig. 10*a*. As in the transmitter shown in Fig. 6, the pulses supplied by the pulse generator 111 are transmitted to the carrier-wave modulator 106 through the switching device 105, utilised as a code modulator, as soon as the approximation signal is negative with respect to the signal voltage, as will readily be evident by comparison of the Figures 10*a* and 10*b* after the explications about the operation of the transmitter shown in Fig. 6. If the approximation signal $V'_t$ is positive with respect to the signal voltage, the pulses originating from the pulse generator 111, instead of being supplied to the carrier-wave modulator 106, are supplied through a lead 147 to one of the input circuits of the pulse widener 109. As before, across the pulse widener a switching voltage as shown in Fig. 10*c* is set up owing to the sequences of pulses shown in Fig. 10*b*, which are derived from the code-pulsegroup modulator 105, said switching voltage being supplied in push-pull to the code-pulsegroup demodulator 110.

As shown in Fig. 10*a*, the approximation signal $V'_t$, which may also be obtained at the receiving end, apparently constitutes as good an approximation of the signal $V_s$ to be transmitted as in the transmitter shown in Fig. 6. However, at equidistant moments indicated by vertical dotted lines in Fig. 10*a*, the maximum divergence of the approximation signal with respect to the signal to be transmitted is now actually greater than one unit of the amplitude quantization utilised. In the transmitting device shown in Fig. 6, the maximum divergence of the approximation signal, at the moments of sampling, with respect to the stage-like signal $V_t$ supplied to the difference producer is, as shown in Fig. 7*a*, smaller than one unit of the amplitude quantization utilised. This implies that the quantizing noise present in the transmitted signal $V'_t$ of Fig. 10*a* is greater than that in Fig. 7*a*. The greater quantizing noise in the method of transmission shown in Fig. 10*a* becomes smaller, however, as the cycle frequency differs to a greater extent from the maximum signal frequency to be transmitted, so that the method of transmission shown in Fig. 10*a* may be utilised with advantage at a maximum signal frequency of, for example, 3400 cycles/sec., if the cycle frequency is about 35 kc./sec.

In the transmitting devices so far described, the signal frequencies integrating network utilised in the negative feedback circuit is constituted by a resonant circuit having a tuning frequency lower than the lowest signal frequency. As already mentioned in the foregoing, it may be advantageous for uniform amplitude load at all signal frequencies to utilise in the negative feedback circuit a further signal-frequencies-integrating network which exhibits a limiting frequency corresponding to a central or lower signal frequency. The signal frequencies-integrating networks employed must preferably not exhibit resonances in the range of the signal frequencies, which requires the use of networks which may be constituted by resistances and condensers or by resistances and inductances.

We now proceed with a discussion of receivers for use in connection with the transmitting devices shown.

Fig. 11 shows one advantageous form of a receiver according to the invention, which may be used for reception of signals emitted by a transmitter as shown in Figs. 1 and 4 and in which use is made of code-pulsegroups in which succeeding pulses represent amplitude values increasing according to a binary count system, whereas synchronising signals are received between succeeding code-pulsegroups.

Figures 12A, 12B, 12C, 12D, 12E, 12F, 12G, 12H, 12I:
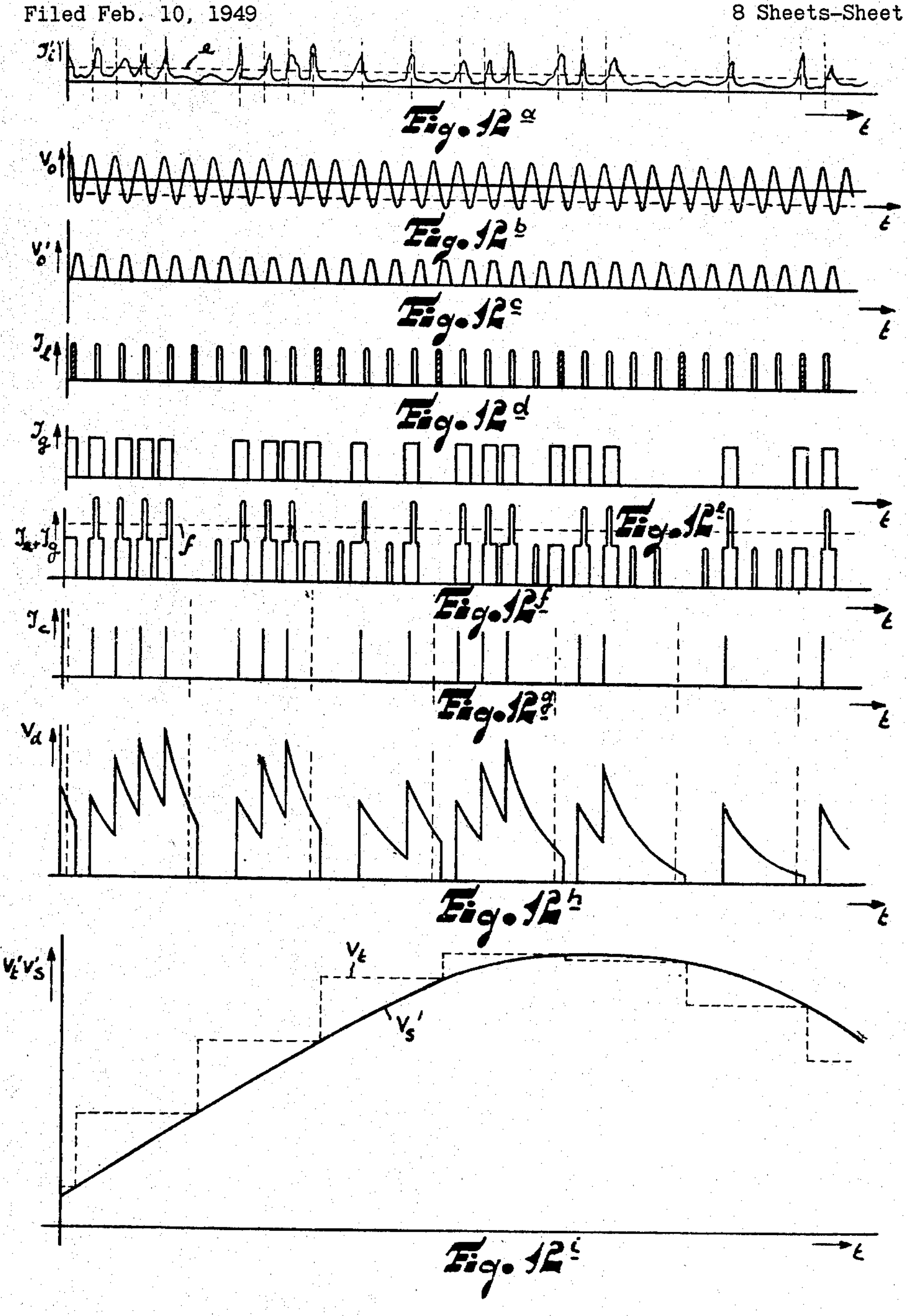

The signals received by an aerial 172 are supplied to a high-frequency amplifier with detector of a construction known per se, which is indicated by 173 in block form in Fig. 11 and in which furthermore the incoming synchronizing pulses are separated from the other incoming pulses in a manner known per se. It is assumed that the synchronising pulses occur with negative polarity across the leads 174, whereas all the incoming pulses, including the synchronising pulses, occur across the lead 175. For the sake of simplicity, the detected pulses occurring across the lead 175 are shown in Fig. 12*a* as pulses $I_1$ of positive polarity, allowance having been made for any noise voltages. The amplitude of the incoming pulses materially varies as a result of disturbance and variations in the transmission path between the transmitter and the receiver, whilst furthermore the shape and position of the incoming pulses are subject to variations. Fig. 12a shows, by means of vertical dotted lines, the positions which the incoming pulses would occupy if they coincided with pulses of a sequence of equidistant pulses. A determined threshold level is indicated by a horizontal dotted line e, which shows that the points at which the pulses surpass the said threshold level do not correspond to points at which pulses belonging to an equidistant sequence of pulses would surpass this threshold level.

The use of code-modulation provides the possibility of correcting timeshifts of the incoming pulses. For this purpose the receiver shown in Fig. 11 comprises a pulse generator for generating equidistant pulses, which is constituted by an oscillator 176, a pulse producer 177, a cycle-pulse generator 178, and a frequency corrector 179. The locally-produced equidistant pulses occur in output leads 180, 181 and 182.

The oscillator 176 serves to generate a sinusoidal voltage having a frequency corresponding to the pulse-recurrence frequency occurring in a code-pulse-group. The oscillator is realised in the form of a Hartley oscillator. The two extremities of an oscillatory circuit 183 are capacitively coupled to the anode and the control grid respectively of a pentode 184, a tapping of the coil of the oscillatory circuit 183, similarly as the cathode of the tube 184, being connected to earth. A sinusoidal voltage as shown in Fig. 12b is set up at the anode of tube 184 and is supplied across a coupling condenser 185 to a phase-shifting network comprising a resistance 186 and a variable condenser 187.

The voltage $V_o$ derived from the phase shifter and shown with the correct phase in Fig. 12b is supplied to the control grid of an amplifying tube 188 provided in the pulse producer 177. The amplifying tube comprises a control grid which has no negative grid-bias applied to it and this by connecting the grid resistance 189 directly to the cathode of the tube 188. Furthermore provision is made of a grid-current limiting resistance 190. The grid-control range of the tube 188 is smaller than the amplitude of the sinusoidal oscillations of Fig. 12b which are supplied thereto. Due to the absence of grid-bias, the positive half-waves of the sinusoidal voltage of Fig. 12b will be completely suppressed by the action of the grid-current limiting resistance 190, and of the negative half-waves only a portion becomes active since the tube 188 is cut-off upon occurrence of the negative peak values of the control voltage. Consequently, trapezoidal voltage pulses $V'_o$ of positive polarity as shown in Fig. 12c are set up at the anode resistance 191 of the tube 188. The said trapezoidal voltage pulses are supplied to a differentiating network connected to the anode of the tube 188 and constituted by the series-combination of the condenser 192 and a resistance 193, one extremity of which is connected to earth. A positive and a negative voltage pulse successively occur at the resistance 193 of the differentiating network upon each trapezoidal voltage pulse, the negative pulses being suppressed by means of a diode 194, which is connected parallel to the resistance 193. The resultant voltage pulses $I_e$ of positive polarity are supplied by way of a decoupling resistance 195 to an output lead 180 and are shown in Fig. 12d.

The pulses shown in Fig. 12d are equidistant and exhibit, for example, a duration of one microsecond at a recurrence frequency of 70 kc./sec. Their phase is adjustable by means of the variable phase-shifter 186, 187. The recurrence frequency is given by the tuning frequency of the local oscillator 176 and must be in exact conformity with the recurrence frequency of the pulses supplied by the pulse generator 39 shown in Fig. 4.

In order to make this possible, a frequency corrector 179 comprising a pentode 196 used as a variable reactance is connected parallel to the frequency-determining circuit 183 of the oscillator 176. The pentode comprises a control grid which is connected to a phase-shifting network comprising a resistance 198 and a condenser 199 and connected parallel to the tube by way of a coupling condenser 197, so that the alternating anode voltage is supplied to the control grid with a phase-shift of approximately 90°. The anode of the reactance tube is connected to the anode side of the oscillatory circuit 183. By means of a voltage divider comprising a cathode resistance 200 and a shunting condenser 203, the control grid acquires a suitable negative grid-bias. As is well-known, such a wattless back-coupled amplifying tube behaves as a reactance, the value of which is variable by means of a control voltage supplied to the control grid through a lead 202.

An AFC-mixing stage 203 is provided for generating the control voltage required for automatic frequency correction (AFC) of the oscillator 176. This mixing stage comprises two diodes housed in a single tube 204 and connected in push-pull, the sinusoidal oscillations of 70 kcs./sec. derived, by way of a coupling condenser 205, from the anode of the oscillator tube 184 being supplied in push-pull to the said diodes with the use of a transformer 206. Furthermore, the synchronizing pulses (recurrence frequency, for example, 7 kcs./sec.) derived from the detector 173 are supplied, through the lead 174, with negative polarity and equal phase to the two diodes 204. In such a push-pull mixing circuit which is fed in the manner indicated, an output voltage is set up across an output resistance 207 included between the anodes of the diodes, said output voltage being dependent in value and polarity upon the time-interval between the synchronizing pulses and the passages through zero of the sinusoidal voltage of the oscillator 177. If the pulses occur at a moment at which the instantaneous value of the sinusoidal voltage is positive, a positive output voltage ensues. If a negative instantaneous value coincides with a pulse, a negative output voltage ensues. Consequently, the output voltage is dependent upon the phase of the synchronizing pulses with respect to the sinusoidal voltage and may be utilised to correct the phase of the sinusoidal voltage so as to bring it in conformity with the phase of the synchronizing pulses. In order to ensure this, the output voltage of the push-pull mixing stage 203 is supplied by way of a low-pass filter 208 transmitting direct voltages to the control grid of the tube 196, constituting a variable reactance. The time-constant of the low-pass filter comprising resistances 209, 210 and a smoothing condenser 211 is chosen to be such that alternating voltages having a frequency corresponding to the lowest signal frequency are substantially suppressed. Signal frequencies incidentally entering into the synchronizing channel are thus prevented from causing fluctuation of the phase of the sinusoidal alternating voltage derived from the oscillator 176. However, the direct voltage set up across the condenser 211 will be dependent in value and polarity upon the mean phase difference between the incoming synchronizing pulses and the sinusoidal voltage supplied by the oscillator 176, with the result that the phase (and hence the frequency) of the voltage of the oscillator 176 is brought in conformity with the incoming synchronizing pulses and synchronism is ensured between the frequency of the oscillator 176 and the pulse generator 39 of the transmitter shown in Fig. 4.

Pulses of cycle frequency are required to be generated in the receiver shown in Fig. 11, similarly as in the transmitter shown in Fig. 4. For this purpose the positive pulses derived from the pulse producer 177 are supplied by way of a coupling condenser 212 to a cycle-pulse generator 178, which comprises a secondary-emission tube 213, which is connected as a pulse generator by means of a feedback condenser 214, provided between the auxiliary cathode and the control grid. Such pulse generators are known per se, so that it suffices here to mention that the tube 213 is, as a rule, cut-off by a negative grid-bias set up at the parallel combination of a cathode resistance 213 and a condenser 216. The time-constant of this parallel combination is chosen to be such that only each fifth pulse of the pulses supplied by way of the coupling condenser 212 to the control grid of the tube is capable of deblocking the secondary-emission tube. As soon as anode current begins to flow in the secondary-emission tube, the potential of the auxiliary cathode of the tube which is connected via an auxiliary cathode-resistance 217 to the source of anode supply, increases, which potential increase is transferred by way of the feedback condenser 214 to the control grid of the tube, thus facilitating release of the tube. However, as soon as the anode current decreases as a result of the feed-back condenser being charged by grid current flowing in the tube, this decrease brings about a decrease of the auxiliary-cathode potential, which potential decrease is transmitted, as before, by way of the feedback condenser 214 to the control grid and hence results in the tube being rapidly cut-off. The duration of the anode current pulse across the tube is dependent on the time-constant of the feedback circuit and, hence, is adjustable to a suitable value by the use of a grid-current limiting resistance 218, which is connected in series with the feedback condenser 214.

The generated voltage pulses of cycle frequency, the front of which exactly coincides with the front of pulses derived from the pulse producer 177, may be derived with positive polarity from the auxiliary-cathode resistance 217 and with negative polarity from an anode resistance 219. The positive pulses set up at the auxiliary cathode resistance 217 are supplied to a differentiating network comprising a condenser 220 and a resistance 221, one end of which is connected to earth. Upon each pulse of cycle frequency, a pulse of positive polarity and a pulse of negative polarity are successively set up at the resistance 220, the positive pulse only being active in the further part of the arrangement and carried off through the lead 182. Similarly, the negative cycle pulses set up at the anode resistance 219 are supplied to a differentiating network comprising a condenser 222 and a resistance 223, so that the latter has set up at it pairs of pulses, of which the first pulse is negative and the second pulse is positive. These positive pulses coincide with the negative pulses set up at the resistance 221 of the differentiating network connected to the auxiliary cathode and hence occur after the positive pulses in the lead 182. Of the positive and negative pulses set up across the lead 181, the positive pulses only, as before, become active in the further part of the arrangement, these positive pulses occurring with retardation with respect to the positive pulses in the lead 182. This retardation is dependent on the duration of the anode-current pulses in the secondary-emission tube 213 of the pulse generator 178 and is adjustable to a suitable value by suitable choice of the grid-current limiting resistance 218, included in the feedback circuit.

The negative pulses set up at the anode resistance 219 are also supplied to the output lead 180, connected to pulse producer 177, so that of the pulses derived from the pulse producer 177, each fifth pulse is suppressed by a negative pulse supplied by the cycle-pulse generator, as shown in Fig. 12*d* by cross-hatching of each fifth pulse.

We now proceed with the discussion of the receiver cascade proper. In order to eliminate timeshifts of the pulses derived from the detector 173 through the lead 175, these pulses are substituted by pulses of the pulse generator 176 to 179. For this purpose the incoming pulses, shown in Fig. 12*a*, are supplied with negative polarity to a gate pulse generator 224, which comprises two pentode systems coupled in a crosswise manner and housed in a single tube 225, which systems are connected as a one-shot-multivibrator. The anode circuits of the pentodes comprise anode resistances 226 and 227 respectively. The control grid of the first pentode system is coupled by way of a condenser 228 to the anode of the second pentode system, whereas the control grid of the last-mentioned pentode system is galvanically coupled by means of a voltage divider 229 to the anode of the first pentode system. The control grid of the first pentode system is furthermore connected by way of a high-ohmic resistance 230 to the positive terminal 239 of a source of anode supply (not shown). The common cathode lead of the pentode systems includes a cathode resistance 232, which is shunted capacitively.

The described circuit-arrangement comprising two pentodes coupled in a crosswise manner is known per se. Its operation is as follows. At the so-called rest position, the control grid of the first pentode system conveys grid current due to the positive grid-bias applied by way of the resistance 230. The anode current of the first pentode system thus has a high value and the potential of the anode thereof has a correspondingly low value. A fairly low voltage is set up across the voltage divider 229, which is included between the anode of the first pentode system and earth and the positive voltage set up between earth and the control grid of the second pentode system thus being not sufficient to overcome the negative grid-bias brought about by the cathode resistance 232, so that the second pentode system is cut-off. However, as soon as the anode current decreases due to a voltage pulse of negative polarity supplied to the control grid of the first pentode system, the second pentode system is released due to the galvanic coupling and the circuit-arrangement flips over with the result that the first pentode system is cut-off and the second pentode system conveys the full anode current. This state is maintained only during a period determined by the time-constant of the circuit for discharging the coupling condenser 228. After the charge of the coupling condenser 228 has decreased to such extent that the first pentode system is released, the circuit falls back into the rest position. Upon subsequent renewed supply of a negative pulse to the control grid of the first pentode system, the described cycle is repeated. By a suitable choice of the values of the coupling condenser 228 and of the grid resistance 230, the duration of the conductive state of the first pentode system may be controlled, for example in such manner that the anode resistance of the first pentode system has set up at it positive voltage pulses having a duration equal to half the minimum time-interval between the incoming pulses.

The widened pulses $I_g$ thus obtained from the incoming pulses shown in Fig. 12*a* are represented in Fig. 12*e* and supplied across a coupling condenser 233 to a coincidence mixer 234, which comprises a tube 235 of the hexode type and the detail construction of which corresponds to the coincidence mixer 60 shown in Fig. 4. The substitution pulses $I_e$ produced in the lead 180 and shown in Fig. 12*d* are supplied to the first control grid of the coincidence mixer 234. The incoming widened pulses $I_g$ are set up as gate pulses at the second control grid thereof. The control-grid bias of the hexode 235 is chosen to be such that only coinciding pulses $I_e+I_g$ of Figs. 12*d* and 12*e* are capable of deblocking the hexode, as shown diagrammatically in Fig. 12*f* by a threshold voltage *f*. Consequently, only the pulses $I_0$ shown in full lines in Fig. 12*g* appear across the anode circuit of the hexode 235, which pulses are identical with the pulses emitted by the transmitter of Fig. 4, in so far as they belong to the code-pulsegroups. The synchronizing pulses are suppressed.

The resultant sequence of code-pulsegroups is supplied by way of a coupling condenser 236 to a code-pulsegroup demodulator 237 which corresponds to the code-demodulator 71 which has already been described with reference to Fig. 4. The code-demodulator 237 comprises a pentode 238, which can only be deblocked by positive pulses supplied to the control grid. Since pulses produced in the anode circuit of the coincidence mixer 234 exhibit negative polarity, the coupling condenser 236 and a resistance 239 connected in series therewith are united to form a differentiating network so that the desired positive pulses appear at the resistance 239. The said voltage pulses bring about reproduction (cf. $V_d$, Fig. 12*h*) of the amplitude values characterized by the incoming code-pulsegroups in a code-demodulator network provided in the anode lead of the pentode 238 and constituted by an anode resistance 239 and a condenser 240 connected parallel thereto.

The voltage values thus reproduced are supplied by way of a coupling condenser 241 and a cathode follower 242 to a sampling circuit 243, which becomes operative in the rhythm of the cycle frequency upon reception of each code-pulsegroup at the instants indicated by vertical dotted lines in Fig. 12*h* owing to positive testing pulses supplied to the control grid of a triode 244 and derived from the lead 182.

The values of the sampled voltage could be converted into an approximation signal, as in the negative feedback circuit of the transmitter shown in Fig. 4. This conversion is effected in a somewhat different manner in the receiver shown in Fig. 11.

The output lead of the sampling circuit 243 is connected directly to a signal frequencies integrating network 245, which comprises a series-resistance 246, together with a transverse resistance 247 and an integration condenser 248, connected parallel thereto. Each time as the triode 244 of the sampling circuit 243 becomes conductive, the integration condenser 249 has supplied to it a current pulse, the intensity of which corresponds to the voltage value reproduced in the demodulator 237 upon reception of a code-pulse-group, from which the step-like approximation signal $V'_t$ ensues as shown in Fig. 12*i*. This signal is supplied, if necessary by way of a further signal frequencies-integrating network having a cut-off frequency of, say, 1000 c./s., to a reproducing device 252, for example a loudspeaker, by way of a coupling condenser 249, a low-pass filter 250, which serves to suppress the pulse recurrence frequency, and a low-frequency amplifier 251. The resultant signal voltage is indicated by $V'_s$ in Fig. 12*i*.

In the construction of the receiver shown in Fig. 11, the charge of the condenser 240 produced in the code-demodulator 237 upon reception of each code-pulse group is required to be removed for the purpose of preparing it on the reception of a subsequent code-pulsegroup. This is ensured by means of a triode 253, which is connected parallel to the condenser 240 and which, as a rule, is cut-off, the triode 253 having supplied to it control pulses occurring subsequent to the sampling pulses and derived from the lead 181. In the foregoing it has already been described in detail that the pulses of cycle frequency produced in the lead 181 are retarded with respect to the pulses produced in the lead 182, as is necessary here.

Fig. 13 shows a receiver adapted for use in connection with a transmitting device as shown in Fig. 6 or 9, in which use is made of code-pulsegroups of succeeding pulses, which represent amplitude values decreasing in accordance with a binary count system.

In this figure those elements which are identical with elements of Fig. 11 are indicated by the reference numerals already used therein.

As before, the pulses received by an aerial 172 are supplied to a detector 173 comprising output leads 174 and 175 in which synchronizing pulses and the incoming code-pulsegroups respectively occur, which are transmitted separately. The code-pulsegroups are supplied to a pulse widener 224, the widened pulses derived therefrom being supplied as gating pulses to a coincidence mixer 254, the construction of which materially differs from that of the coincidence mixer 234, utilised in the receiver of Fig. 11. The construction of this mixer will be referred to later.

For generating the pulses locally required, provision is made of several pulse generators. As in the receiver shown in Fig. 11, the incoming code pulses are substituted by adjacent pulses from a series of locally-produced equidistant pulses which are derived from a pulse generator comprising the oscillator 176, the frequency corrector 179, and the pulse producer 177, the tuning frequency of the oscillator 176 being corrected by means of an AFC-voltage which is supplied by way of a low-pass filter 208 to the frequency corrector 179 and which is generated in the AFC-mixing stage 203 by mixture of the incoming synchronizing pulses with the voltage of the oscillator 176. As in Fig. 11, the substitution pulses occur in the output lead 180. Furthermore, the pulse producer 177 is coupled to a cycle-pulse generator 178 which, in the present instance, comprises only one output lead, namely the lead 182. As in the transmitter shown in Fig. 6, the cycle-pulse generator 178 in the receiver shown in Fig. 13 should be designed to be such that only one out of every four pulses derived from the pulse producer 177 is transmitted.

The substitution pulses are supplied through the lead 180 to the coincidence mixer 254, which comprises a switching tube 255, the detail construction of which corresponds to the switching tube 131 of a transmitter shown in Fig. 6. The gating pulses derived from the pulse widener 224 and corresponding to the incoming pulses are supplied to one of the deflection plates 256 of the switching tube, thus directing the electron beam towards the output electrode 257, whereas in the absence of gating pulses the electron beam is directed towards the other output electrode 258 of the tube by suitable choice of the bias voltage at the deflection plates. Substitution pulses derived from the pulse producer 177 and supplied across coupling condenser 259 to the anode 260 of the switching tube, which is realised as a grid electrode, will thus be supplied, dependently upon the occurrence of gating pulses, to either the electrode 257 or the electrode 258.

In Fig. 14*a*, the pulses supplied to the output electrode 257 are shown as positive pulses and those supplied to the output electrode 258 are shown with negative polarity.

The resultant sequences of pulses are supplied across coupling condensers 261, 262 to the control electrodes of a pulse widener 263, which corresponds to the pulse widener indicated by 109 in Fig. 6 and which supplies push-pull switching voltages of the wave-forms shown in Figs. 14*b* and 14*c*.

The said switching voltages are supplied in push-pull via leads 264, 265 to a code-pulse group demodulator 266, which comprises a signal frequencies integrating network and the construction of which exactly corresponds to that of the demodulator designated 110 in Fig. 6, so that further description thereof seems to be unnecessary. For generating the exponentially-varying control voltage required in this demodulator, pulses of cycle frequency are supplied through the lead 182, coupled to the cycle-pulse generator, to the parallel-connected first control-grids of the pentodes 267 and 268 provided in the demodulator 266.

The signal voltage characterized by the incoming code-pulse groups is set up across the code-demodulator 266 in the manner described with reference to Fig. 6 and Figures 8*a–f* and, in the receiver shown in Fig. 13, is supplied to a loudspeaker 271 via a lowpass filter 269, suppressing pulse recurrence frequencies, and an amplifier 270.

For the sake of completeness, the control voltages appearing at the code-demodulator are shown in dotted lines in Figures 14*d* and 14*e*, the anode-current pulses produced in the tubes 267 and 268 of the code-demodulator being shown in full lines. In Fig. 14*f*, the approximation signal appearing at the integration condenser of the code-demodulator is designated $V'_t$.

The receiver cascade shown in Fig. 13 does not comprise, following the demodulator, a sampling circuit and, if desired, a holding condenser. In order to limit quantizing noise, it is advantageous, however, to utilise a sampling circuit at the receiving end, if this was also the case at the transmitting end. In this case the sampling circuit is required to be operated by cycle pulses derived from the cycle-pulse generator 178, due to which the step-like signal $V_t$, which provides the signal voltage $V'_s$, may be derived from the code-demodulator 266, shown in dotted line in Fig. 14*f*.

What we claim is:

1. In a pulse code modulation system, encoding apparatus for deriving from applied intelligence signals pulse code modulated signals, said apparatus comprising a source of periodic timing impulses, a voltage-responsive pulse code modulator coupled to said source to initiate at cyclical moments corresponding to said impulses a pulse group wherein the presence or absence of pulses within a predetermined series of equidistant instants characterizes the nearest amplitude level of an applied voltage at a given moment, a difference producer having first and second inputs therefor, means to supply said intelligence signals as a first input to said difference producer, a pulse code demodulator to quantize an applied pulse group, a first signal frequencies integrating network in serial connection with said demodulator, means coupled to the output of the modulator and responsive to said cyclical pulse groups and including said demodulator and said first network for deriving a signal from said modulator which approximate said intelligence signals, means to supply said approximation signal in phase opposition to said intelligence signal as a second input to said difference producer, and means coupling the output of the difference producer to the input of the modulator whereby the voltage representing the difference between said approximation signal and said intelligence signal is pulse code modulated; and decoding apparatus for deriving from said pulse code modulated signals said applied intelligence signals.

2. In a pulse code modulation system, encoding apparatus for deriving from applied intelligence signals pulse code modulated signals, said apparatus comprising a source of periodic timing impulses, a voltage-responsive pulse code modulator coupled to said source to initiate at cyclical moments corresponding to said impulses a pulse group wherein the presence or absence of pulses within a predetermined series of equidistant instants characterizes the nearest amplitude level of an applied voltage at a given moment, a difference producer having first and second inputs therefor, means to supply said intelligence signals as a first input to said difference producer, a pulse code demodulator to quantize an applied pulse group, a first signal frequencies integrating network in serial connection with said demodulator, means coupled to the output of the modulator and responsive to said cyclical pulse groups and including said demodulator and said first network for deriving a signal from said modulator which approximate said intelligence signals, means to supply said approximation signal in phase opposition to said intelligence signal as a second input to said difference producer, and means coupling the output of the difference producer to the input of the modulator whereby the voltage representing the difference between said approximation signal and said intelligence signal is pulse code modulated; and decoding apparatus for deriving from said pulse code modulated groups said applied intelligence signals, comprising a pulse code demodulator for deriving from said pulse groups signals whose amplitude values are a predetermined function of said intelligence signals, a second signal frequencies integrating network responsive to said amplitude value signals to produce integrated amplitude value signals therefrom, means responsive to said integrated signals to derive said intelligence signals therefrom.

3. In a pulse code modulation system, encoding apparatus for deriving from applied intelligence signals pulse code modulated signals, said apparatus comprising a source of periodic timing impulses, a voltage-responsive pulse code modulator coupled to said source to initiate at cyclical moments corresponding to said impulses a pulse group wherein the presence or absence of pulses within a predetermined series of equidistant instants characterizes the nearest amplitude level of an applied voltage at a given moment, a difference producer having first and second inputs therefor, means to supply said intelligence signals as a first input to said difference producer, a pulse code demodulator to quantize an applied pulse group, a first signal frequencies integrating network in serial connection with said demodulator, means coupled to the output of the modulator and responsive to said cyclical pulse groups and including said demodulator and said first network for deriving a signal from said modulator which approximate said intelligence signals, means to supply said approximation signals in phase opposition to said intelligence signals as a second input to said difference producer, and means coupling the output of the difference producer to the input of the modulator whereby the voltage representing the difference between said aproximation signals and said intelligence signals are pulse code modulated.

4. Encoding apparatus as set forth in claim 3 wherein said difference producer includes a resistance network having three resistors which respectively represent the first and second inputs and the output of the difference producer.

5. Encoding apparatus as set forth in claim 3 wherein said difference producer includes first and second amplifying electron discharge tubes respectively responsive to said intelligence and approximation signals, the output of one of said tubes being the output of the difference producer.

6. Encoding apparatus, as set forth in claim 3, wherein said timing impulse source includes means producing impulses having a repetition rate at least four times higher than the highest frequency of said intelligence signals.

7. In a pulse code modulation system, encoding apparatus for deriving from applied intelligence signals pulse code modulated signal groups, said apparatus comprising a source of periodic timing impulses, a voltage-responsive pulse code modulator coupled to said source to initiate at cyclical moments corresponding to said impulses a pulse group wherein the presence or absence of pulses within a predetermined series of equidistant instants characterizes the nearest amplitude level of an applied voltage at a given moment, a difference producer having first and second inputs therefor, a sampling device coupled to said source for sampling said intelligence signals upon occurrence of a timing impulse, means to supply said sampled intelligence signals as a first input to said difference producer, a pulse code demodulator, a first signal frequencies integrating network in serial connection with said demodulator, means coupled to the output of the modulator and responsive to said signal groups and including said demodulator and said network for deriving from said modulator signals which approximate said intelligence signals, means to supply said approximation signals in phase opposition to said sampled intelligence signals as a second input to said difference producer, and means coupling the output of the difference producer to the input of the modulator whereby the voltage representing the difference between said approximation signals and said sampled intelligence signals is pulse code modulated in the form of said signal groups.

8. In a pulse code modulation system, encoding apparatus for deriving from applied intelligence signals pulse code modulated signal groups, said apparatus comprising a source of periodic timing impulses, a voltage-responsive pulse code modulator coupled to said source to initiate at cyclical moments corresponding to said impulses a pulse group wherein the presence or absence of pulses within a predetermined series of equidistant instants characterizes the nearest amplitude level of an applied voltage at a given moment, a difference producer having first and second inputs therefor, a first sampling device coupled to said source for sampling said intelligence signals upon the occurrence of a timing impulse, means to supply said sampled intelligence signals as a first input to said difference producer, a pulse code demodulator, a first signal frequencies integrating network, a second sampling device coupled to said source and interposed between said demodulator and said network for sampling the output of said demodulator upon the occurrence of a timing impulse, means coupled to the output of the modulator and responsive to said signal groups and including said demodulator, said second sampling device and said first network for deriving from said modulator sampled signals which approximate said intelligence signals, means to supply said sampled approximation signals in phase opposition to said sampled intelligence signals as a second input to said difference producer, and means coupling the output of the difference producer to the input of the modulator whereby the voltage representing the difference between said sampled approximation signals and said sampled intelligence signals is pulse code modulated in the form of said signal groups.

9. Encoding apparatus as set forth in claim 8 wherein said means coupled to said modulator to derive approximation signals therefrom includes further means whereby said approximation signals have initial values that decrease at a predetermined exponential rate.

10. Encoding apparatus as set forth in claim 8 wherein said means coupled to said modulator to derive approximation signals therefrom includes further means whereby the initial value of an approximation signal will decrease to half its value in the time interval established between two successive signal elements.

11. In a pulse code modulation system, encoding apparatus for deriving from applied intelligence signals pulse code modulated signal groups having a predetermined number of signal elements, said elements being represented by pulses which are present and absent in an alternation dependent upon said intelligence signals, said apparatus comprising a source of periodic timing impulses, a voltage-responsive pulse code modulator coupled to said source and whose output cyclically yields said signal groups at moments corresponding to said impulses, said modulator including an electronic switching device having at least first and second switching conditions, said signal elements being represented by pulses when said device is in said second switching condition, a difference producer having first and second inputs therefor, means to supply said intelligence signals as a first input to said difference producer, a pulse code demodulator, a first signal frequencies integrating network in serial connection with said demodulator, means coupled to the output of the modulator and responsive to said signal groups and including said demodulator and said first network for deriving from said modulator signals which approximate said intelligence signals, means to supply said approximation signals in phase opposition to said intelligence signals as a second input to said difference producer, and means coupling the output of the difference producer to the input of the modulator in a condition at which the polarity of the difference producer output voltage determines the switching condition of said device, whereby the polarity of signals representing the difference between said approximation signals and said intelligence signals determines the pulse content of said signal groups.

12. Encoding apparatus as set forth in claim 11 further including a pulse widener stage, wherein said signal groups are supplied through said modulator and said stage to said demodulator.

13. In a pulse code modulation system, encoding apparatus for deriving from applied intelligence signals pulse code modulated signal groups having a predetermined number of signal elements, said elements being represented by pulses which are present and absent in an alternation dependent upon said intelligence signals, said apparatus comprising a source of periodic timing impulses a voltage-responsive pulse code modulator coupled to said source and whose output yields cyclically said signal groups at moments corresponding to said impulses, said modulator including an electronic switching device having first and second switching conditions, said signal elements being represented by pulses when said device is in said second switching condition, a difference producer having first and second inputs therefor, means to supply said intelligence signals as a first input to said difference producer, a pulse code demodulator having an electron discharge tube with control and output electrodes therefor, said control electrode in the absence of an applied voltage having a bias which renders said tube nonconductive, means coupled to said source to apply a saw-tooth control voltage in accordance with the frequency of said impulses to said output electrode, a pulse widener stage responsive to said signal groups for supplying gating pulses to the control electrode of said tube, a first signal frequencies integrating network in serial connection with said demodulator, said first network being coupled to the output electrode of said tube, means responsive to said gating pulses and including said demodulator and said first network for deriving from said pulse widener stage signals which approximate said intelligence signals, means to supply said approximation signals in phase opposition to said intelligence signals as a second input to said difference producer, and means coupling the output of the difference producer to the input of the modulator in a condition at which the polarity of the difference producer output voltage determines the switching condition of said device whereby the polarity of the signals representing the difference between said approximation signals and said intelligence signals determines the pulse content of said signal groups.

14. Encoding apparatus as set forth in claim 13 wherein said pulse widener stage and said demodulator operate in push-pull and wherein said switching device has two output circuits, one of said output circuits being coupled to the input of said pulse widener stage, and wherein signal pulses are supplied to said pulse widener stage input only when said switching device is in said second switching condition.

15. Encoding apparatus as set forth in claim 14 wherein said switching device further includes a switching tube having two secondary emission electrodes, said secondary emission electrodes being coupled to said two output circuits of said device, an electron gun for producing an electron beam and deflection electrodes responsive to the difference signal produced in the output of said difference producer for directing said beam upon either one of said secondary emission electrodes in accordance with the polarity of said difference signal.

16. In a pulse code modulation system, encoding apparatus for deriving from applied intelligence signals pulse code modulated signal groups having a predetermined number of signal elements, said elements being represented by pulses which are present and absent in an alternation dependent upon said intelligence signals, said apparatus comprising a source of periodic timing impulses, a push-pull pulse code modulator coupled to said source and whose output yields said signal groups at moments corresponding to said impulses, said modulator including an electronic switching device with two output circuits therefor, said device having first and second switching conditions, said signal elements being represented by pulses when said device is in said second switching condition, a difference producer having first and second inputs therefor, means to supply said intelligence signals as a first input to said difference producer, a pulse code demodulator having an electron discharge tube with control and output electrodes therefor, said control electrode in the absence of an applied voltage having a bias which renders said tube nonconductive, means coupled to said source to apply a saw-tooth control voltage of the frequency of said impulses to said output electrode, a push-pull pulse widener stage responsive to said signal groups for supplying gating pulses to the control electrode of said tube, said pulse widener stage including two tubes having control electrodes which are intercoupled in a condition at which only one of the tubes in said stage can be substantially conductive at one time and which are respectively coupled to the output circuits of said switching device, a first signal frequency network in serial connection with said demodulator, said first network being coupled to the output electrode of said tube, means responsive to said gating pulses and including said demodulator and said first network for deriving from said pulse widener stage signals which approximate said intelligence signals, means to supply said approximation signals in phase opposition to said intelligence signals as a second input to said difference producer, and means coupling the output of the difference producer to the input of the modulator in a condition at which the polarity of the difference producer output voltage determines the switching condition of said device whereby the polarity of the signals representing the difference between said approximation signals and said intelligence signals determines the pulse content of said signal groups.

17. Encoding apparatus as set forth in claim 16 wherein said demodulator has two tubes having control electrodes which are biased to render said demodulator tubes normally nonconductive and which are coupled in push-pull to the output of said pulse widener stage, said demodulator tubes further having output electrodes coupled in push-pull to said first network, and wherein said sawtooth control voltage is applied to the output electrodes of both of said demodulator tubes.

18. Apparatus as set forth in claim 17 further including means coupled to said source and synchronized therewith to generate signal pulses at a frequency corresponding to the repetition frequency of said signal elements and means including a resistance shunted by a capacitance for supplying said repetition frequency signal pulses to the control electrodes of said demodulator tubes.

19. Apparatus as set forth in claim 18 wherein the resistance shunted by the capacitance has a time constant value at which the initial voltage developed across said capacitance decays to half its value in the time interval established between two successive signal elements.

20. In a pulse code modulation system, decoding apparatus for deriving from pulse code modulated signal groups the intelligence and synchronization signals represented thereby, said intelligence signals having a predetermined maximum frequency, said groups being generated at a recurrence frequency whose magnitude is at least four times as large as said predetermined maximum frequency and having a predetermined number of signal elements, said elements being represented by pulses which are present and absent in an alternation dependent upon said intelligence and synchronization signals, said apparatus comprising means responsive to said signal groups to separate the intelligence pulse elements from the synchronization pulse elements, a first pulse generator for producing pulses of signal element frequency, a frequency corrector coupled to said first generator, means responsive to said synchronization pulse elements to derive therefrom an automatic frequency control voltage, means to supply said control voltage to said frequency corrector to maintain the frequency of said first generator substantially constant, means coupled to said first generator and responsive to said intelligence pulse elements to derive substituted signal pulses therefrom, a pulse code demodulator for deriving from said substituted signal pulses, signals whose amplitude values are a predetermined function of said intelligence signals, a signal frequencies integrating network responsive to said amplitude value signals to produce integrated amplitude value signals therefrom, and means responsive to said integrated signals to derive said intelligence signals therefrom.

21. Decoding apparatus as set forth in claim 20 wherein said means coupled to said first generator includes a gating stage for deriving gating pulses from said intelligence pulse elements and a coincidence mixer coupled to said first generator and responsive to said gating pulses, said substituted signal pulses being produced in the output of said coincidence mixer.

22. Decoding apparatus as set forth in claim 21 wherein said coincidence mixer includes bias means to maintain it normally inoperative, said bias means having a value at which the mixer is rendered operative only when a gating pulse and a pulse of signal element frequency are simultaneously supplied to said mixer.

23. Decoding apparatus as set forth in claim 21 wherein said coincidence mixer includes a switching tube having an anode coupled to said first generator, an electron gun for producing an electron beam, two secondary emission electrodes, deflection electrodes responsive to said gating pulses for directing said beam upon either one of said secondary emission electrodes in accordance with the polarity of said gating pulses, said switching tube being provided with two output circuits respectively coupled to said two secondary emission electrodes.

24. In a pulse code modulation system, decoding apparatus for deriving from pulse code modulated signal groups the intelligence and synchronization signals represented thereby, said intelligence signals having a predetermined maximum frequency, said groups being generated at a recurrence frequency whose magnitude is at least four times as large as said predetermined maximum frequency and having a predetermined number of signal elements, said elements being represented by pulses which are present and absent in an alternation dependent upon said intelligence and synchronization signals, said apparatus comprising means responsive to said signal groups to separate the intelligence pulse elements from the synchronization pulse elements, a first pulse generator for producing pulses of signal element frequency, a second pulse generator responsive to said signal frequency pulses for producing pulses of said recurrence frequency, a frequency corrector coupled to said first generator, means responsive to said synchronization pulse elements to derive therefrom an automatic frequency control voltage, means to supply said control voltage to said frequency corrector to maintain the frequency of said generator substantially constant, means coupled to said first generator and responsive to said intelligence pulse elements to derive substituted signal pulses therefrom, a pulse code demodulator for deriving from said substituted signal pulse, signals whose amplitude values are a predetermined function of said intelligence signals, a sampling device for sampling said amplitude value signals upon the occurrence of a sampling pulse, means coupled to said second generator to supply sampling pulses of said recurrence frequency to said sampling device, a signal frequencies integrating network responsive to said sampled amplitude value signals to produce integrated amplitude value signals therefrom, and means responsive to said integrated signals to derive said intelligence signals therefrom.

25. In a pulse code modulation system, decoding apparatus for deriving from pulse code modulated signal groups the intelligence signals represented thereby, said groups being generated at a predetermined recurrence frequency and having a predetermined number of signal elements, said elements being represented by pulses which are present and absent in an alternation dependent upon said intelligence signals, said apparatus comprising means responsive to said signal groups to derive substituted signal groups therefrom, a pulse widener stage responsive to said substituted signal groups to widen the pulses thereof, a pulse code demodulator coupled to said pulse widener stage for deriving from said substituted signal groups having widened pulses, signals whose initial amplitude values are a predetermined function of said intelligence signals, said initial values thereafter decreasing at a predetermined rate, said demodulator including a signal frequencies integrating network responsive to said amplitude value signals to produce integrated amplitude value signals therefrom, and means responsive to said integrated signals to derive said intelligence signals therefrom, said demodulator further including an electron discharge tube having a control electrode biased to render said tube nonconductive in the absence of an applied signal and wherein said pulse widener stage produces gating pulses which are supplied to said control electrode, said decoding apparatus further including means to generate a saw-tooth voltage of said recurrence frequency and means for supplying said saw-tooth voltage to said tube.

26. In a pulse code modulation system, decoding apparatus for deriving from pulse code modulated signal groups the intelligence and synchronization signals represented thereby, said intelligence signals having a predetermined maximum frequency, said groups being generated at a recurrence frequency whose magnitude is at least four times as large as said predetermined maximum frequency and having a predetermined number of signal elements, said elements being represented by pulses which are present and absent in an alternation dependent upon said intelligence and synchronization signals, said apparatus comprising means responsive to said signal groups to separate the intelligence pulse elements from the synchronization pulse elements, a first pulse generator for producing pulses of signal element frequency, a frequency corrector coupled to said first generator, means responsive to said synchronization pulse elements to derive therefrom an automatic frequency control voltage, means to supply said control voltage to said frequency corrector to maintain the frequency of said generator substantially constant, a coincidence mixer coupled to said first generator and responsive to said intelligence pulse elements to derive substituted signal pulses therefrom, a push-pull pulse widener stage coupled to the output of said coincidence mixer for producing substituted widened signal pulses, a push-pull code demodulator coupled to said pulse widener stage for deriving from said substituted widened signal pulses, signals whose amplitude values are a predetermined function of said intelligence signals, a series integrating network responsive to said amplitude value signals to produce integrated amplitude value signals therefrom, and means responsive to said integrated signals to derive said intelligence signals therefrom.

27. Decoding apparatus as set forth in claim 26 wherein said push-pull pulse widener stage includes first and second electron discharge tubes having control electrodes cross-coupled in a condition wherein only one of said first and second tubes can be substantially conductive at one time and wherein said coincidence mixer has two output circuits respectively coupled to the control electrodes of said first and second tubes.

28. Decoding apparatus as set forth in claim 27 wherein said push-pull pulse code demodulator includes third and fourth electron discharge tubes having control electrodes biased to render said third and fourth tubes nonconductive in the absence of an applied signal, the control electrodes of said third and fourth tubes being coupled in push-pull to the output of said pulse widener stage, and wherein said demodulator is coupled in push-pull to said network, said apparatus further including means to generate a saw-tooth voltage of said recurrence frequency and means to supply said saw-tooth voltage to said third and fourth tubes.

29. Decoding apparatus as set forth in claim 28 wherein said third and fourth tubes have additional control electrodes and wherein said means supplying saw-tooth voltage includes a time delay network having a resistance shunted by a capacitance, said time delay network being coupled to said additional control electrodes of the third and fourth tubes.

30. Decoding apparatus as set forth in claim 29 wherein said time delay network has a time constant at which the initial voltage developed in said capacitance decays to half its value in the time interval established between two successive pulses of element frequency.

JAN FREDERIK SCHOUTEN.
FRANK DE JAGER.

References Cited in the file of this patent

UNITED STATES PATENTS

| Number | Name | Date |
|---|---|---|
| 2,013,671 | Roe | Sept. 10, 1935 |
| 2,114,255 | Powell | Apr. 12, 1938 |
| 2,139,655 | Allensworth | Dec. 13, 1938 |
| 2,207,744 | Larson | July 16, 1940 |
| 2,438,908 | Goodall | Apr. 6, 1948 |
| 2,464,607 | Pierce | Mar. 15, 1949 |
| 2,505,029 | Carbrey | Apr. 25, 1950 |
| 2,510,054 | Alexander | June 6, 1950 |
| 2,514,671 | Rack | July 11, 1950 |
| 2,516,587 | Peterson | July 25, 1950 |
| 2,520,125 | Clavier | Aug. 29, 1950 |